(12) United States Patent
Ponte

(10) Patent No.: US 8,572,069 B2
(45) Date of Patent: Oct. 29, 2013

(54) SEMI-AUTOMATIC INDEX TERM AUGMENTATION IN DOCUMENT RETRIEVAL

(75) Inventor: Jay Michael Ponte, Burlington, MA (US)

(73) Assignee: Apple Inc., Cupertino, CA (US)

( * ) Notice: Subject to any disclaimer, the term of this patent is extended or adjusted under 35 U.S.C. 154(b) by 945 days.

(21) Appl. No.: 11/395,211

(22) Filed: Apr. 3, 2006

(65) Prior Publication Data
US 2007/0027902 A1 Feb. 1, 2007

Related U.S. Application Data

(60) Continuation of application No. 10/265,466, filed on Oct. 4, 2002, now Pat. No. 7,024,416, which is a division of application No. 09/596,644, filed on Jun. 19, 2000, now Pat. No. 6,496,818, which is a continuation-in-part of application No. 09/282,730, filed on Mar. 31, 1999, now Pat. No. 7,047,242, and a continuation-in-part of application No. 09/283,268, filed on Mar. 31, 1999, now Pat. No. 6,826,559.

(51) Int. Cl.
*G06F 7/00* (2006.01)

(52) U.S. Cl.
USPC .......................................................... 707/722

(58) Field of Classification Search
USPC .......................................................... 707/722
See application file for complete search history.

(56) References Cited

U.S. PATENT DOCUMENTS

| | | | |
|---|---|---|---|
| 4,003,024 A | 1/1977 | Riganati et al. | |
| 4,365,304 A | 12/1982 | Ruhman et al. | |
| 4,719,642 A | 1/1988 | Lucas | |
| 5,181,162 A | 1/1993 | Smith et al. | |
| 5,187,747 A | 2/1993 | Capello et al. | |
| 5,206,949 A | 4/1993 | Cochran et al. | |
| 5,274,802 A | 12/1993 | Altine | |
| 5,321,833 A | 6/1994 | Chang et al. | |
| 5,369,761 A | 11/1994 | Conley et al. | |
| 5,371,807 A | 12/1994 | Register | |
| 5,398,335 A | 3/1995 | Lewis | |
| 5,404,514 A * | 4/1995 | Kageneck et al. | 707/5 |
| 5,412,566 A | 5/1995 | Sawa | |
| 5,418,961 A | 5/1995 | Segal et al. | |
| 5,497,491 A | 3/1996 | Mitchell et al. | |
| 5,544,360 A | 8/1996 | Lewak et al. | |
| 5,619,410 A | 4/1997 | Emori et al. | |

(Continued)

FOREIGN PATENT DOCUMENTS

| | | |
|---|---|---|
| EP | 0813158 | 12/1997 |
| EP | 0944008 | 9/1999 |
| EP | 1195676 | 4/2002 |
| JP | 2000112990 A * | 4/2000 |

OTHER PUBLICATIONS

U.S. Appl. No. 09/282,764, filed Mar. 31, 1999, Jay Michael Ponte et al.

(Continued)

*Primary Examiner* — Hung Q Pham
*Assistant Examiner* — Hubert Cheung
(74) *Attorney, Agent, or Firm* — Blakely, Sokoloff, Taylor & Zafman LLP

(57) ABSTRACT

Disclosed are methods and systems for indexing or retrieving materials accessible through computer networks.

14 Claims, 11 Drawing Sheets

(56) References Cited

U.S. PATENT DOCUMENTS

| | | | |
|---|---|---|---|
| 5,619,709 A | 4/1997 | Caid et al. | |
| 5,625,767 A | 4/1997 | Bartell et al. | |
| 5,659,732 A | 8/1997 | Kirsch | |
| 5,659,742 A | 8/1997 | Beattie et al. ................ 707/104 |
| 5,704,560 A | 1/1998 | Wimmer | |
| 5,715,443 A * | 2/1998 | Yanagihara et al. ............. 707/3 |
| 5,717,924 A | 2/1998 | Kawai | |
| 5,721,897 A * | 2/1998 | Rubinstein .................. 707/2 |
| 5,724,571 A | 3/1998 | Woods | |
| 5,734,887 A | 3/1998 | Kingberg et al. | |
| 5,754,938 A | 5/1998 | Herz et al. | |
| 5,764,906 A | 6/1998 | Edelstein et al. | |
| 5,781,904 A | 7/1998 | Oren et al. | |
| 5,794,178 A | 8/1998 | Caid et al. | |
| 5,802,527 A | 9/1998 | Brechtel et al. | |
| 5,809,261 A | 9/1998 | Lambrecht | |
| 5,809,502 A | 9/1998 | Burrows | |
| 5,819,092 A | 10/1998 | Ferguson et al. | |
| 5,819,291 A | 10/1998 | Haimowitz et al. | |
| 5,826,261 A * | 10/1998 | Spencer ........................ 707/5 |
| 5,832,476 A | 11/1998 | Tada et al. | |
| 5,835,087 A | 11/1998 | Herz et al. | |
| 5,845,278 A | 12/1998 | Kirsch et al. | |
| 5,855,015 A | 12/1998 | Shoham | |
| 5,870,740 A | 2/1999 | Rose et al. | |
| 5,895,470 A | 4/1999 | Pirolli et al. | |
| 5,898,780 A | 4/1999 | Liu et al. | |
| 5,899,999 A | 5/1999 | De Bonet | |
| 5,907,837 A | 5/1999 | Ferrel et al. | |
| 5,915,249 A | 6/1999 | Spencer ........................ 707/5 |
| 5,920,859 A | 7/1999 | Li | |
| 5,924,105 A | 7/1999 | Punch et al. | |
| 5,926,811 A | 7/1999 | Miller et al. .................. 707/5 |
| 5,933,822 A | 8/1999 | Braden-Harder et al. | |
| 5,937,392 A | 8/1999 | Alberts | |
| 5,937,402 A | 8/1999 | Pandit | |
| 5,941,947 A | 8/1999 | Brown et al. | |
| 5,943,669 A | 8/1999 | Numata | |
| 5,950,198 A | 9/1999 | Falls et al. | |
| 5,956,039 A | 9/1999 | Woods et al. | |
| 5,956,716 A | 9/1999 | Kenner et al. | |
| 5,956,722 A | 9/1999 | Jacobson et al. | |
| 5,960,430 A | 9/1999 | Haimowitz et al. | |
| 5,983,216 A * | 11/1999 | Kirsch et al. .................. 707/2 |
| 5,987,457 A * | 11/1999 | Ballard ........................ 707/5 |
| 5,991,755 A | 11/1999 | Noguchi et al. | |
| 5,995,979 A | 11/1999 | Cochran | |
| 6,006,230 A | 12/1999 | Ludwig et al. | |
| 6,008,806 A | 12/1999 | Nakajima et al. | |
| 6,009,410 A | 12/1999 | LeMole et al. | |
| 6,009,459 A | 12/1999 | Belfiore et al. | |
| 6,014,663 A | 1/2000 | Rivette et al. | |
| 6,018,733 A | 1/2000 | Kirsch et al. | |
| 6,026,388 A | 2/2000 | Liddy et al. | |
| 6,028,605 A | 2/2000 | Conrad et al. | |
| 6,029,195 A | 2/2000 | Herz | |
| 6,032,145 A | 2/2000 | Beall et al. | |
| 6,035,330 A | 3/2000 | Astiz et al. | |
| 6,038,561 A | 3/2000 | Snyder et al. | |
| 6,047,310 A | 4/2000 | Kamakura et al. | |
| 6,055,528 A | 4/2000 | Evans | |
| 6,055,535 A | 4/2000 | Suzuoka et al. | |
| 6,061,515 A | 5/2000 | Chang et al. | |
| 6,067,552 A | 5/2000 | Yu | |
| 6,070,158 A * | 5/2000 | Kirsch et al. ................. 707/3 |
| RE36,727 E | 6/2000 | Kageneck et al. | |
| 6,073,140 A | 6/2000 | Morgan et al. | |
| 6,078,916 A | 6/2000 | Culliss | |
| 6,078,929 A | 6/2000 | Rao | |
| 6,081,774 A | 6/2000 | De Hita et al. | |
| 6,092,061 A | 7/2000 | Choy | |
| 6,094,649 A | 7/2000 | Bowen et al. | |
| 6,098,064 A | 8/2000 | Pirolli et al. | |
| 6,098,066 A | 8/2000 | Snow et al. | |
| 6,101,515 A | 8/2000 | Wical et al. | |
| 6,101,537 A | 8/2000 | Edelstein et al. | |
| 6,122,647 A | 9/2000 | Horowitz et al. | |
| 6,128,613 A | 10/2000 | Wong et al. | |
| 6,148,289 A | 11/2000 | Virdy | |
| 6,154,811 A | 11/2000 | Srbljic et al. | |
| 6,157,930 A | 12/2000 | Ballard et al. | |
| 6,167,398 A | 12/2000 | Wyard et al. | |
| 6,167,404 A | 12/2000 | Morcos et al. | |
| 6,178,418 B1 | 1/2001 | Singer | |
| 6,182,083 B1 | 1/2001 | Scheifler et al. | |
| 6,182,133 B1 | 1/2001 | Horvitz | |
| 6,189,019 B1 | 2/2001 | Blumer et al. | |
| 6,199,082 B1 | 3/2001 | Ferrel et al. | |
| 6,209,038 B1 | 3/2001 | Bowen et al. | |
| 6,212,517 B1 | 4/2001 | Sato et al. | |
| 6,233,575 B1 | 5/2001 | Agrawal et al. | |
| 6,243,723 B1 | 6/2001 | Ikeda et al. | |
| 6,253,248 B1 | 6/2001 | Nakai et al. | |
| 6,269,361 B1 | 7/2001 | Davis et al. | |
| 6,269,368 B1 | 7/2001 | Diamond | |
| 6,282,542 B1 | 8/2001 | Carneal et al. | |
| 6,286,000 B1 | 9/2001 | Apte et al. | |
| 6,295,529 B1 | 9/2001 | Corston-Oliver et al. | |
| 6,308,168 B1 | 10/2001 | Dovich et al. | |
| 6,327,574 B1 | 12/2001 | Kramer et al. | |
| 6,334,145 B1 | 12/2001 | Adams et al. | |
| 6,336,112 B2 | 1/2002 | Chakrabarti et al. | |
| 6,338,059 B1 | 1/2002 | Fields et al. | |
| 6,347,312 B1 | 2/2002 | Byrne et al. | |
| 6,353,822 B1 | 3/2002 | Lieberman | |
| 6,353,825 B1 | 3/2002 | Ponte | |
| 6,356,899 B1 | 3/2002 | Chakrabarti et al. | |
| 6,360,215 B1 | 3/2002 | Judd et al. ........................ 707/3 |
| 6,363,373 B1 * | 3/2002 | Steinkraus ........................ 707/3 |
| 6,363,378 B1 * | 3/2002 | Conklin et al. .................... 707/5 |
| 6,374,241 B1 | 4/2002 | Lamburt et al. .................... 707/6 |
| 6,389,412 B1 | 5/2002 | Light | |
| 6,393,415 B1 | 5/2002 | Getchius et al. ................. 707/2 |
| 6,393,427 B1 | 5/2002 | Vu et al. | |
| 6,397,228 B1 | 5/2002 | Lamburt et al. .............. 707/203 |
| 6,405,188 B1 | 6/2002 | Schwartz et al. | |
| 6,408,294 B1 | 6/2002 | Getchius et al. ................. 707/5 |
| 6,415,250 B1 | 7/2002 | Van Den Akker | |
| 6,421,683 B1 | 7/2002 | Lamburt ....................... 707/104 |
| 6,484,161 B1 | 11/2002 | Chipalkatti et al. | |
| 6,490,719 B1 | 12/2002 | Thomas | |
| 6,493,721 B1 | 12/2002 | Getchius et al. | |
| 6,496,818 B1 * | 12/2002 | Ponte ........................... 707/2 |
| 6,496,843 B1 | 12/2002 | Getchius et al. | |
| 6,507,839 B1 * | 1/2003 | Ponte .............................. 707/3 |
| 6,513,031 B1 | 1/2003 | Fries et al. | |
| 6,546,556 B1 | 4/2003 | Kataoka et al. | |
| 6,567,854 B1 | 5/2003 | Olshansky et al. | |
| 6,574,631 B1 | 6/2003 | Subramanian et al. | |
| 6,578,056 B1 | 6/2003 | Lamburt | |
| 6,578,113 B2 | 6/2003 | Krishnamurthy et al. | |
| 6,581,038 B1 | 6/2003 | Mahran | |
| 6,581,056 B1 | 6/2003 | Mahran | |
| 6,631,496 B1 | 10/2003 | Li | |
| 6,718,363 B1 | 4/2004 | Ponte | |
| 6,826,559 B1 * | 11/2004 | Ponte ............................. 707/3 |
| 6,850,935 B1 * | 2/2005 | Ponte ............................. 707/6 |
| 6,907,429 B2 | 6/2005 | Carneal et al. | |
| 6,954,901 B1 | 10/2005 | Desai et al. | |
| 6,978,419 B1 | 12/2005 | Kantrowitz | |
| 6,981,256 B2 | 12/2005 | Jawahar et al. | |
| 7,047,242 B1 * | 5/2006 | Ponte ............................ 707/10 |
| 7,080,089 B2 | 7/2006 | Plaisted et al. | |
| 7,110,996 B2 * | 9/2006 | Kawamura ..................... 707/3 |
| 7,251,637 B1 | 7/2007 | Caid et al. | |
| 7,263,530 B2 * | 8/2007 | Hu et al. ....................... 707/102 |
| 7,392,303 B2 | 6/2008 | Smith et al. | |
| 7,409,422 B2 | 8/2008 | Christian et al. | |
| 7,467,349 B1 | 12/2008 | Bryar et al. | |
| 7,596,609 B1 | 9/2009 | Refuah et al. | |
| 7,628,320 B2 | 12/2009 | Rhoads | |
| 7,653,623 B2 | 1/2010 | Kashima et al. | |
| 7,657,506 B2 | 2/2010 | Levin | |
| 7,720,837 B2 | 5/2010 | Kusnitz et al. | |

(56) References Cited

U.S. PATENT DOCUMENTS

| | | | |
|---|---|---|---|
| 7,801,887 B2* | 9/2010 | Knepper et al. | 707/723 |
| 7,837,094 B2 | 11/2010 | Rhoads | |
| 8,396,864 B1* | 3/2013 | Harinarayan et al. | 707/722 |
| 2001/0039544 A1 | 11/2001 | Chakrabarti et al. | |
| 2002/0029376 A1 | 3/2002 | Ambrose et al. | |
| 2002/0073206 A1 | 6/2002 | Jawahar et al. | |
| 2002/0099583 A1 | 7/2002 | Matusek et al. | |
| 2002/0165737 A1 | 11/2002 | Mahran | |
| 2003/0061272 A1 | 3/2003 | Krishnamurthy et al. | |
| 2003/0093433 A1 | 5/2003 | Seaman et al. | |
| 2003/0149578 A1 | 8/2003 | Wong | |
| 2003/0163462 A1* | 8/2003 | Kawamura | 707/3 |
| 2003/0212696 A1 | 11/2003 | Davis et al. | |
| 2004/0064438 A1* | 4/2004 | Kostoff | 707/1 |
| 2004/0230577 A1* | 11/2004 | Kawatani | 707/6 |
| 2006/0167872 A1* | 7/2006 | Parikh | 707/6 |
| 2006/0259481 A1* | 11/2006 | Handley | 707/5 |
| 2008/0195595 A1* | 8/2008 | Masuyama et al. | 707/5 |
| 2009/0037390 A1* | 2/2009 | Handley | 707/3 |
| 2011/0004588 A1 | 1/2011 | Leitersdorf | |

OTHER PUBLICATIONS

U.S. Appl. No. 09/283,815, filed Mar. 31, 1999, Jeffrey Getchius et al.
U.S. Appl. No. 09/283,837, filed Mar. 31, 1999, Renu Chipalkatti et al.
U.S. Appl. No. 09/283,820, filed Mar. 31, 1999, Jeffrey Getchius et al.
U.S. Appl. No. 09/596,583, filed Jun. 19, 2000, Jay Michael Ponte.
U.S. Appl. No. 09/596,616, filed Jun. 19, 2000, Jay Michael Ponte.
U.S. Appl. No. 09/282,493, filed Mar. 31, 1999, Jeffrey Getchius et al.
As filed U.S. Appl. No. 09/282,764, filed Mar. 31, 1999, entitled "Targeted Banner Advertisements".
As filed U.S. Appl. No. 09/282,356.
U.S. Appl. No. 09/283,815, filed Mar. 31, 1999, Generic Object for Rapid Integration of Data Changes.
U.S. Appl. No. 09/282,493 Not Project Related.
As filed U.S. Appl. No. 09/283,816 Not Project Related.
As filed U.S. Appl. No. 09/283,837 Not Project Related.
U.S. Appl. No. 09/282,342, filed Mar. 31, 1999, Data Enhancement Techniques.
As filed U.S. Appl. No. 09/282,495.
As filed U.S. Appl. No. 09/283,820 Not Project Related.
As filed U.S. Appl. No. 09/282,730.
As filed U.S. Appl. No. 09/283,268.
U.S. Appl. No. 09/596,583.
U.S. Appl. No. 09/596,616.
U.S. Appl. No. 09/596,644, "Semi-Automatic Index Term Augmentation in Document Retrieval" Filed Jun. 19, 2000, Non Pending.
Merriam-Webster College Dictionary, 10$^{th}$ Ed. (Springfield MA: Merriam Webster, 1997), p. 70, including definitions of "associate".
Sterne, Jim, "What makes people click: advertising on the Web", (Indianapolis IN: Que Corp., 1997), p. 168.
"Method of Selecting Audio-Clips for Playing During Visual Presentation of Web Pages—Using Software to Select Set of Advertisements in Form of Audio Clips to Rotate for Presentation Based on Search Criteria", IBM Corp., Research Disclosure 411109, Jul. 10, 1998.
"Electronic Directory News", Yellow Pages & Directory Report, v. 12, n. 18, Oct. 23, 1996.

Wong, Clinton, "Example LWP Programs", Web Client Programming with PERL, O'Reilly & Associates, 1997, pp. 117-141.
Rocchio, J.J., Jr., "Relevance Feedback in Information Retrieval", The Smart Retrieval System—Experiments in Automatic Document Processing, Prentice Hall, Inc., N.J., 1971, pp. 313-323.
Callan, James P. et al., "The INQUERY Retrieval System", Proceedings of the Third International Conference on Database and Expert Systems Application, pp. 78-83, Springer Verlag, 1992.
Larkey, Leah S., "Combining Classifiers in Text Categorization", Center for Intelligent Information Retrieval, Department of Computer Science, University of Massachusetts, Amherst, MA., pp. 1-10, Mar. 20, 1996.
Aronow, D.B. et al., "Automated Classification of Encounter Notes in a Computer Based Medical Record", Proc. of 8th World Congress on Med. Informatics, Vancouver, Canada (Jul. 1995), pp. 8-12.
Lewis, D.D., et al., "Training Algorithms for Linear Text Classifiers", Proceedings of the Nineteenth Annual International ACM SIGIR Conference on Research and Development in Information Retrieval, Zurich, Switzerland. 1996. pp. 198-315.
Doug P's Review of Paper, "Information Retrieval Performance by Relevance Feedback", by Salton, Gerard et al., Dept. of Computer Science, Cornell University, Ithaca, NY.
Haines, David et al., "Relevance Feedback and Inference Networks", University of Massachusetts. pp. 1-5, Aug. 22, 1994.
"Introduction to TCP/IP", Yale University, Feb. 2, 1995, Internet Article, http://www.yale.edu/pclt/comm/tcpip.htm.
Sullivan, Danny, "How Search Engines Rank Web Pages", Internet Article on SearchEngineWatch.com, 1999.
Barlow, Linda, "A Helpful Guide to Web Search Engines", Internet Article on www.monash.com, Aug. 1999.
Barlow, Linda, "How to Use Web Search Engines", Internet Article on www.monash.com, Aug. 1999.
Leistensnider et al., "A Simple Probabilistic Approach to Classification and Routing", IEEE, 1997, pp. 750-754.
U.S. Appl. No. 09/282,764, filed Mar. 31, 1999 (225 pages).
Long-term Response: Finite Populations, Draft Version Dec. 10, 1998, © Dec. 2000, B. Walsh and M. Lynch (pp. 291-345).
How Search Engines Work (http://www.searchenginewatch.com.webmasters'work.html) (3 pages).
Improving Retrieval Performance by Relevance Feedback by Gerard Salton and Chris Buckley, Journal of the American Society For Information Science—Jun. 1990 (pp. 288-297).
As Filed U.S. Appl. No. 09/282,195.
As Filed U.S. Appl. No. 09/282,295.
As Filed U.S. Appl. No. 09/282,342.
As Filed U.S. Appl. No. 09/596,644.
Biswas et al, Iterate: A Conceptual clustering Algorithm for Data Mining, IEEE, pp. 219-229, 1999.
Chakrabarti et al, "Scalable feature selection, classification and signature generation for organizing large text databases into hierarchical topic taxonomies", ACM, May 27, 1998, pp. 163-178.
GTE Superpages, Business Editors, Oct. 23, 1997.
Jones et al, "Topic-based browsing within a digital library using keyphrases", ACM, Dec. 1998, pp. 114-121.
Lin et al, "logical structure analysis of book document images using content information", IEEE< 1997, pp. 1048-1054.
Moffat et al, "self-Indexing inverted files for fast text retrieval", ACM, 1996, pp. 349-379.
Blankenhorn, Dana, Competitors finding opportunity, perils in Nets Inc. demise, Business Marketing, p. 3, Jun. 1997.

* cited by examiner

SEMI-AUTOMATIC INDEX TERM AUGMENTATION IN DOCUMENT RETRIEVAL

CROSS-REFERENCE TO RELATED APPLICATIONS

This patent application is a continuation of application Ser. No. 10/265,466, filed on Oct. 4, 2002, now U.S. Pat. No. 7,024,416, which is a divisional of application Ser. No. 09/596,644, filed on Jun. 19, 2000, now U.S. Pat. No. 6,496,818, which is a continuation-in-part of application Ser. No. 09/282,730, filed on Mar. 31, 1999, now U.S. Pat. No. 7,047,242, and application Ser. No. 09/283,268, filed on Mar. 31, 1999, now U.S. Pat. No. 6,826,559.

TECHNICAL FIELD

This invention relates to techniques for organizing material on computer networks for retrieval, and more particularly to methods of indexing material of interest to a user.

BACKGROUND OF THE INVENTION

Computer networks have become increasingly important for the storage and retrieval of documents and other material.

The Internet, of which the World Wide Web is a part, includes a series of interlinked computer networks and servers around the world. Users of one server or network connected to the Internet may send information to, or access information on, other networks or servers connected to the Internet by the use of various computer programs which allow such access, such as Web browsers. The information is sent to, or received from, a network or server in the form of packets of data.

The World Wide Web portion of the Internet comprises a subset of interconnected Internet sites which may be characterized as including information in a format suitable for graphical display on a computer screen. Each site may include one or more separate pages. Pages, in turn, may include links to other pages within the site, or to pages in other Web sites, facilitating the user's rapid movement from one page or site to another.

In view of the quantity of information and material available on computer networks such as the Web, and for other reasons as well, automated or semi-automated techniques for retrieving information that is thought to be relevant to a user at a given time may be employed. These techniques may be utilized in response to a specific user request, as when a search query by a user seeks information These techniques also may be utilized when a user is accessing certain material, in order to make available material that it is thought may be of interest to a user who has accessed the original material. These techniques may also be utilized when a user, given access to particular material, requests other similar material. Other situations when these information retrieval techniques may be employed will also be apparent to one of ordinary skill in the art.

Some information retrieval techniques such as those that are employed in these circumstances choose documents for retrieval from among documents in a collection based upon the occurrence of specified terms in the documents in the collection. (Hereinafter, for simplicity, "document" shall be used to refer to the items, such as Web pages or Web sites, in the collection being analyzed.) There are a variety of different techniques for specifying the terms to be used. (A "term" maybe any word, number, acronym, abbreviation or other collection of letters, numbers and symbols which may be found in a fixed order in a document.) In some methods, a search may be made among the documents in the collection for some or all of the terms in a search query generated by the user. In other methods, a search may be made for some or all of the text of a given document. (In some methods, all terms except certain common words, referred to as stop words, such as "the" or "and", may be included in the search.) In other methods, a search may be made for index terms which have been associated with that document by various means. Still other methods will use a combination of the above techniques, and further approaches to selecting terms for which a search is to be made will be familiar to one of ordinary skill in the art.

After a list of terms for which a search is to be made has been compiled, many information retrieval techniques then proceed by calculating scores for each document in the collection over which the search is being made, based upon the occurrence of the terms on the list in the documents. These scores which are calculated may be referred to as term frequency scores, insofar as the score assigned to a document depends on the frequency of occurrence of terms in the document.

There are a variety of different formulae which may be used to calculate these term frequency scores, including for example the Robertson's term frequency score (RTF). Term frequency score formulae may assign varying weights to terms found in a document, depending upon such factors as the relative rareness or commonness of the term. Other factors which may be used to vary the weight assigned to a term in calculating a term frequency score will also be apparent to one of ordinary skill in the art.

Documents in a collection which is being searched may be divided into different sections or segments, such as an introduction or summary, a main body, footnotes, captions, and the like. Other divisions of documents will be apparent to one of ordinary skill in the art.

A Web site may permit a user to obtain lists of relevant items of interest, such as Web sites, other documents or names of merchants carrying merchandise in particular categories. The site may be organized so that an item of interest may be considered to be in more than one category. The site may be organized so that the categories presented to the user may vary, depending on a term or terms specified by the user. If this approach is utilized, the user may input terms that relate to the merchandise in which he is interested, such as "automobiles", and in return he may be presented with several categories, such as "automobiles, manufacturers" or "automobiles, sales" or "automobiles, service." The categories presented may be chosen by any one of a number of techniques that will be familiar to one of ordinary skill in the art.

It may be desirable to present additional material to a user who is searching for items of interest. For example, it may be desirable to present the user with banner advertisements which relate to the item of interest for which he is searching.

BRIEF DESCRIPTION OF DRAWINGS

The above-mentioned and other features of the invention will now become apparent by reference to the following description taken in connection with the accompanying drawings in which.

SUMMARY OF THE INVENTION

Figure 1:
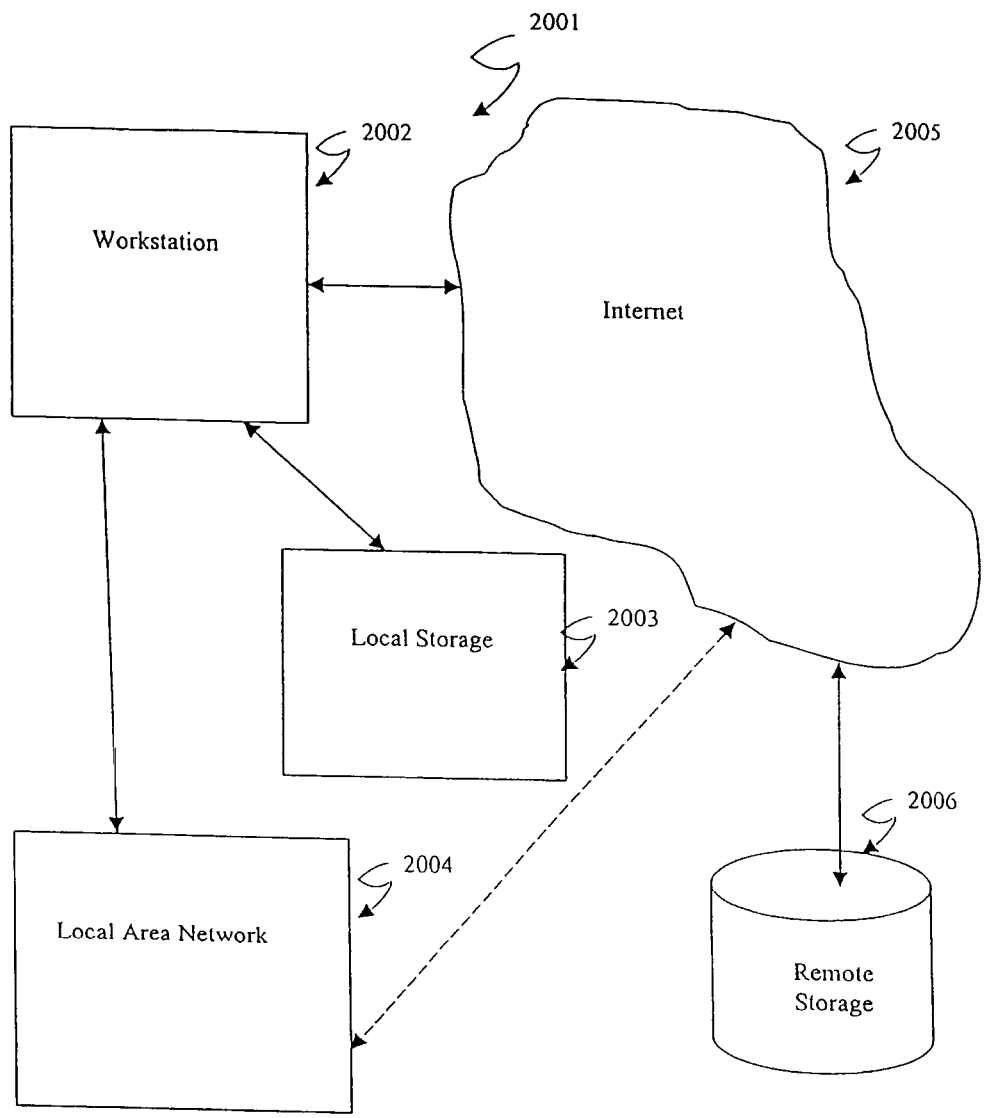
FIG. 1 is a schematic diagram of a computer system that may be operated according to the present invention.

According to the present invention, a method and device for assigning index terms to a document $D_i$ in a collection of documents, where other documents in the collection have previously had index terms assigned, comprises selecting a term $I_j$ from among a set of terms from which the index terms are being assigned, calculating a log likelihood ratio for the document $D_i$ and a document $D_k$ in the collection to which the term $I_j$ has previously been assigned as an index term, repeating the process for a plurality of other documents $D_k$ in the collection to which the term $I_j$ has previously been assigned as an index term, calculating a total score for the Document $D_i$ for the Index Term $I_j$, repeating these steps for a plurality of other terms $I_j$ from among the set of terms from which index terms are being assigned, and choosing index terms to be assigned to Document $D_i$, from among the set of terms from which index terms are being assigned, based upon the total scores T calculated for the Document $D_i$. The documents may be Web pages, Web sites or other collections of material. The documents in the collection which have previously had index terms assigned to them may have had one and only one index term assigned. The weight assigned to the index term $I_j$ previously assigned to a document $D_n$ may equal 1.0. A fixed number N of terms $I_j$ whose total scores calculated for the Document $D_i$ are the highest may be assigned as index terms for the Document $D_i$. The fixed number N may be equal to 1. All terms $I_j$ whose total scores calculated for the Document $D_i$ exceed a fixed cutoff score may be assigned as index terms for the Document $D_i$.

Further according to the present invention, a method and device for assigning index terms to documents in a collection of documents comprises assigning index terms to a subset of the documents in the collection manually, selecting a document $D_i$ from among the documents in the collection to which index terms have not yet been assigned, selecting a term $I_j$ from among a set of terms from which index terms are being assigned, calculating a log likelihood ratio for the document $D_i$ and a document $D_k$ in the collection to which the term $I_j$ has previously been assigned as an index term, repeating the above step for a plurality of other documents $D_k$ in the collection to which the term $I_j$ has previously been assigned as an index term, calculating a total score for the Document $D_i$ for the Index Term $I_j$, repeating the above steps for a plurality of other terms $I_j$ from among the set of terms from which index terms are being assigned, choosing index terms to be assigned to Document $D_i$, from among the set of terms from which index terms are to be assigned, based upon the total scores calculated for the Document $D_i$, and repeating the above steps for a plurality of other documents in the collection to which index terms have not yet been assigned. The documents may be Web pages, Web sites or other collections of material. Optionally, one and only one index term may be assigned to the documents in the collection to which index terms are assigned manually. The weight assigned to the index term $I_j$ previously assigned to a document $D_n$ may equal 1.0. A fixed number N of terms $I_j$ whose total scores calculated for the Document $D_i$ are the highest may be assigned as index terms for the Document $D_i$. The fixed number N may equal 1. All terms $I_j$ whose total scores calculated for the Document $D_i$ exceed a fixed cutoff score may be assigned as index terms for the Document $D_i$.

Further according to the present invention, a method and device for assigning categories of items to supercategories, or categories of categories, comprises: assigning a subset of the categories in the collection to supercategories manually, selecting a category $C_i$ from among the categories in the collection not yet assigned to supercategories, calculating a likelihood function $L_{ik}$ for the category $C_i$ and a category $C_k$ in the collection which has previously been assigned to a supercategory $S_j$ manually, which likelihood function is based upon the likelihood that a term occurring in the category $C_i$ also occurs in the category $C_k$ repeating the above step for a plurality of other categories $C_k$ in the collection which have previously been assigned to a supercategory $S_j$ manually, assigning the category $C_i$ to a supercategory $S_j$ based on the likelihood functions $L_{ik}$ that a term occurring in the category $C_i$ also occurs in the category $C_k$ which is assigned to supercategory $S_j$, and repeating the above steps for a plurality of other categories in the collection which have not yet been assigned to supercategories and which have not yet been processed. The categories may correspond to varieties of products or services. The items in the categories may correspond to merchants, stores or other sources of the category's product or service, and the merchants, stores or other sources may be associated with more than one category of products or services. The supercategories may correspond to groups of categories as to which it is desired to present the same banner advertisement to a user accessing the categories.

Further according to the present invention, a method and device for assigning categories of items to supercategories, or categories of categories, comprises: assigning a subset of the categories in the collection to supercategories manually, selecting a category $C_i$ from among the categories in the collection not yet assigned to supercategories, selecting a supercategory $S_j$ from among the set of supercategories, calculating a log likelihood ratio for the category $C_i$ and a category $C_k$ in the collection which has previously been assigned to the supercategory $S_j$, repeating the above step for a plurality of other categories $C_k$ in the collection which have previously been assigned to the supercategory $S_j$, calculating a total score for the category $C_i$ for the supercategory $S_j$, repeating the above steps for a plurality of other supercategories $S_j$, assigning category $C_i$ to the supercategory for which the total score calculated for the category $C_i$ is the highest, and repeating the above steps for a plurality of other categories in the collection which have not yet been assigned to supercategories. The categories may correspond to varieties of products or services. The items in the categories may correspond to merchants, stores or other sources of the category's product or service, and the merchants, stores or other sources may be associated with more than one category of products or services The supercategories may correspond to groups of categories as to which it is desired to present the same banner advertisement to a user accessing the categories. For example, in one embodiment there may be about 20,000 categories of products or services, and there may be about 50 supercategories.

DETAILED DESCRIPTION OF THE PREFERRED EMBODIMENT(S)

Referring to FIG. 1, a computer system 2001 includes a workstation 2002 having local storage 2003. The workstation may also be connected to a local area network 2004 and may access to the Internet 2005. The Internet 2005 may include or be coupled to remote storage 2006. The workstation 2002 may be any one of a variety of commercially available computers capable of providing the functionality described in more detail below. The local storage 2003 may include ROM, RAM, a hard disk, a CD, and/or any other media capable of containing data and/or programs for the workstation 2002 or other data. The local area network 2004, which is coupled to and exchanges data with the workstation, may also contain data and/or program information for use by the workstation 2002. The Internet 2005 may be accessed in a conventional manner by the workstation 2002. Alternatively, the workstation 2002 may access the Internet 2005 through the local area network 2004, as shown by the dotted line of FIG. 1. The remote storage 2006 may also contain data and/or program information for the workstation 2002 or may contain other information, as will become apparent from the description below.

The system described herein permits a user (utilizing the computer system 2001 which includes the workstation 2002) who has accessed the Internet 2005, either directly or through the local area network 2004, to be given access to material that may be of interest to him. It will be appreciated by one of ordinary skill in the art that the system may be implemented using a variety of computers and programming languages. The system may be accessed by the user through the Internet 2005 from his workstation 2002 using a Web browser of conventional design, as would be familiar to one of ordinary skill in the art In the prior art, it is well known that information retrieval techniques may be utilized to identify documents, such as Web pages or sites, or portions of documents which may be of interest to a user. (Hereinafter, for simplicity, "document" shall be used to refer to the items, such as [but not limited to] pages or sites, in the collection being analyzed.) These techniques may be called into play in response to a search query initiated by the user. Alternatively, they may be called into play when a user requests additional documents that are similar to a document to which he has been given access. Alternatively; they may be called into play when a user is accessing a particular document, and it is desired to make available to him other documents that are related to the document being accessed. Other circumstances where it may be desirable to utilize information retrieval techniques to identify documents that may be of interest to a user will be apparent to one of ordinary skill in the art.

Information retrieval techniques may choose documents from among the documents in a collection based upon the occurrence in the documents of specified terms. The terms to be utilized in this process may be selected by a number of methods that will be apparent to one of ordinary skill in the art.

One technique that may be employed to select terms to be utilized in the process is to permit the user to specify terms by defining a search query. Another technique that may be employed is to select some or all of the terms in a document being accessed by the user. Another technique that may be employed is to select some or all of the terms in a document identified by the user as being of interest to him, or as having characteristics he wishes to have found in documents made available to him. (In these techniques, all of the terms may be used, or certain common words, referred to as stop words, such as "the" or "and", may be omitted.) Another technique that may be employed is to select index terms which have previously been associated with the document being accessed or selected by the user. Still other techniques may use a combination of the above approaches. Other techniques for selecting terms to be utilized will be apparent to one of ordinary skill in the art.

Once a list of terms has been generated, by the above methods or any other, information retrieval techniques may proceed by calculating, for each document in the collection from which documents of potential interest are to be chosen, a score which reflects the occurrence in the document of the terms on the list. Based upon the scores achieved by the documents in the collection, the documents may be ranked, and a predetermined number of documents may be presented to the user, or all documents which achieve scores above a predetermined cutoff may be presented.

These scores which are calculated for documents are sometimes referred to as term frequency scores, in that the scores depend in part upon the frequency of occurrence of terms in the document.

The formula for calculating a total score $S_D$ for a document D may be written generally as:

$$S_D = \sum_{T=1}^{T_0} TF_{TD}$$

where: $T_0$ is the number of terms T which occur in the collection of terms included in the search, and $TF_{TD}$ is the term frequency score for document D based on the frequency of occurrence in document D of term T.

One particular formula in the prior art which may be used to assign a total score $S_D$ to a document D utilizes Robertson's term frequency score:

$$S_D = \sum_{T=1}^{T_0} TF_{TD} * IDF_T,$$

where: $T_0$ is the number of terms which occur in the collection of terms included in the search, $TF_{TD}$ is Robertson's term frequency for term T in document D, $= N_{TD}/(N_{TD} + K_1 + K_2*(L_D/L_0))$, where: $N_{TD}$ is the number of times the term T occurs in document D, $L_D$ is the length of document D, $L_0$ is the average length of a document in the collection being searched, and $K_1$ and $K_2$ are constants and $IDF_T = \log((N+K_3)/N_T)/\log(N+K_4)$ where:

N is the number of documents in the collection $N_T$ is the number of documents containing the term T in the collection, and $K_3$ and $K_4$ are constants.

Whatever particular formula is used, documents are ranked in order of their total scores $S_D$, and those which achieve the highest score are presented, typically in order of their scores, to the user In order to improve the effectiveness of information retrieval methods, additional terms may be associated with documents before term frequency scores are calculated. For example, index terms or key words may be associated with each document in a collection, and the calculation of term frequency scores may take into account the index terms or key words as well as terms that occur in the documents themselves, or may be based solely on the index terms or key words.

These additional terms may be assigned to a document by means of manual review of the document or by automatic means, or by a combination of manual review and automatic means. Methods for doing so by manual means will be apparent to one of ordinary skill in the art.

The manual assignment of index terms to a document may be time consuming, and this may make it impractical to assign index terms to large collections of documents by this method. In addition, manual assignment of index terms may fail to reveal underlying relationships between documents. It may therefore be useful to utilize automatic techniques to generate appropriate index terms for documents, based upon analysis of the characteristics of the terms which occur in the documents.

In one embodiment of the system described herein, additional index terms are added to a set of documents D in a document collection automatically. In this embodiment, terms are chosen to be added as index terms to a given document $D_i$ automatically according to their co-occurrence to a high degree with terms already found in the document $D_i$, according to the method of local context analysis. This method has been described by Xu and Croft, in Improving the Effectiveness of Informational Retrieval with Local Context Analysis, which is incorporated herein by reference.

Figure 2:
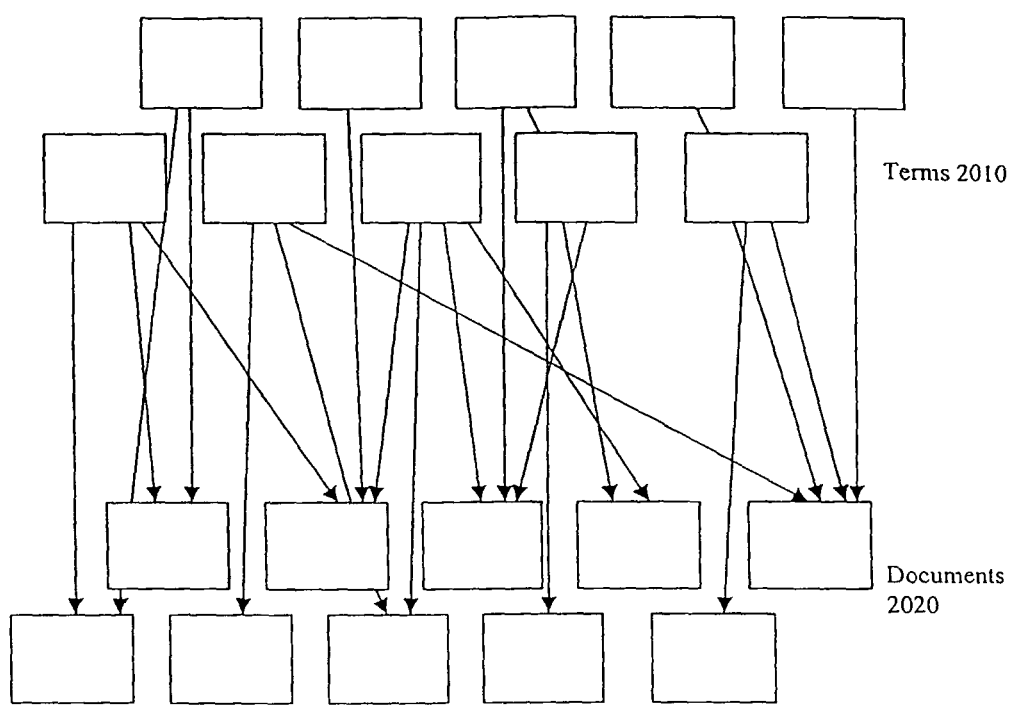
FIG. 2 illustrates a relationship between terms and documents.

FIG. 2 illustrates a collection of Documents D 2020 which contain Terms T 2010. As illustrated in FIG. 2, each Term T 2010 may occur in one or more Documents D 2020, and each Document D 2020 contains one or more Terms T 2010.

Figure 3:
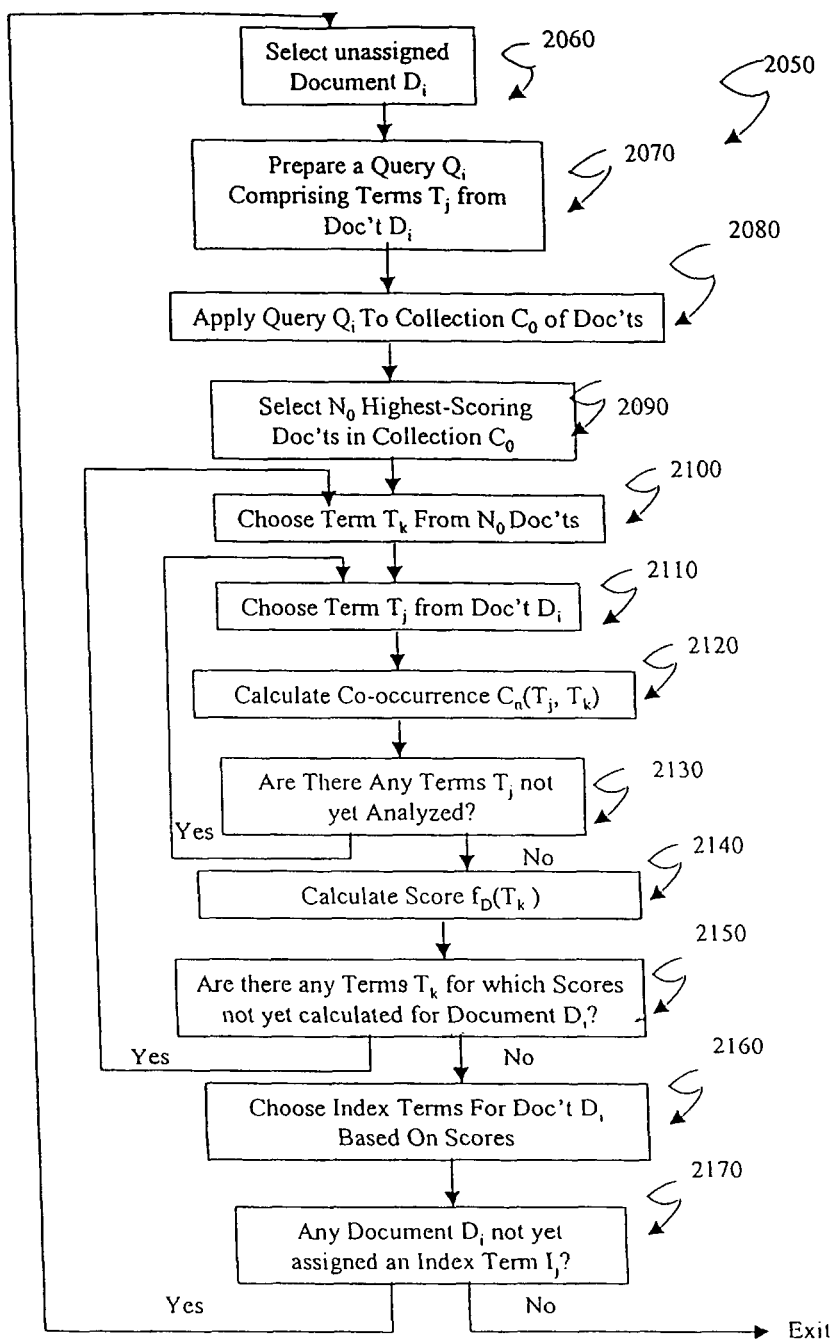
FIG. 3 is a flow chart which illustrates a process, according to the present invention, of automatically assigning index terms to documents.

According to FIG. 3, this method 2050 proceeds first at a step 2060 to select a Document D which has not yet had index terms assigned to it. At step 2070, a search Query $Q_i$ is created, consisting of Terms $T_j$ found in Document $D_i$. In one embodiment of the system, the set of Terms $T_j$ in the Document $D_i$ used to create the Query $Q_i$ comprises all of the Terms in the Document $D_i$. In another embodiment, the set of Terms $T_j$ comprises all of the Terms in the Document $D_i$ except certain common words, referred to as stop words, such as "the" or "and."

In this embodiment, after the query $Q_i$ is prepared at step 2070 it is applied at step 2080 to a chosen collection $C_0$ consisting of H documents. This collection of documents $C_0$ may be the set of documents for which index terms are being generated by automatic means, it may be a larger set of documents including those documents for which index terms are being generated by automatic means as a subset, or it may be another set of documents, such as the set of documents over which searches will be done utilizing the index terms. It is helpful if the collection $C_0$ has the property that the usage of terms in documents in it is characteristic of the usage of terms that will be found in documents over which searches will be carried out using the additional index terms added to the documents.

In applying the query at the step 2080, a total score $S_D$ for a document D in the collection of documents $C_0$ searched may be written generally as:

$$S_D = \sum_{T=1}^{T_0} TF_{TD}$$

where: $T_0$ is the number of terms T which occur in the query $Q_i$, and $TF_{TD}$ is the term frequency score for document D based on the frequency of occurrence in document D of term T, While any one of a number of formulas for term frequency and inverted document frequency which will be known to one of ordinary skill in the art may be used without departing from the spirit and scope of the invention, in one embodiment of the system, Robertson's term frequency score is used to assign a total score $S_D$ to a document D:

$$S_D = \sum_{T=1}^{T_0} TF_{TD} * IDF_T,$$

where: $T_0$ is the number of terms which occur in the query $Q_i$, $TF_{TD}$ is Robertson's term frequency for term T in document D, $= N_{TD}/(N_{TD}+K_1+K_2*(L_D/L_0))$, where: $N_{TD}$ is the number of times the term T occurs in document D, $L_D$ is the length of document D, $L_0$ is the average length of a document in the collection $C_0$ being searched, and $K_1$ and $K_2$ are constants and $IDF_T = \log((N+K_3)/N_T)/\log(N+K_4)$ where:

N is the number of documents in the collection $C_0$ $N_T$ is the number of documents containing the term T in the collection $C_0$, and $K_3$ and $K_4$ are constants.

After the query is run at step 2080, at a step 2090 a number of documents $N_0$ in $C_0$ which achieve the highest scores under the search query $Q_i$ are selected. For example, in various embodiments the number $N_0$ may be between 10 and 300, but it may vary depending on operational considerations which will be apparent to one of ordinary skill in the art. In one embodiment, the number of documents $N_0$ selected is 50. This set of $N_0$ documents has the property that Documents in it contain Terms also found in Document $D_i$, the document which is having index terms assigned to it. The next steps 2100 to 2150 in the process 2050 then attempt to determine which other terms in the $N_0$ documents occur most frequently with the Terms $T_j$ in the Document $D_i$.

After the $N_0$ documents are selected in the step 2090, the system continues at step 2100 by choosing a Term $T_k$ from among the Terms found in the $N_O$ documents. In one embodiment, all terms in the $N_O$ documents are used. In another embodiment, all terms in the $N_O$ documents except certain common words, referred to as stop words, such as "the" or "and," are used, At a step 2110, the system then chooses a Term $T_j$ from among the Terms in the Document $D_i$ which is having index terms assigned to it.

At a step 2120, the system then proceeds by calculating the co-occurrence $C_n(T_j, T_k)$ of the Term $T_k$ from the $N_O$ documents with the Term $T_j$ from the Document $D_i$. The co-occurrence $C_n(T_j, T_k)$ of a given Term $T_k$ which occurs in the $N_O$ documents, with a Term $T_j$ in Document $D_i$, is determined as follows:

$$C_n(T_j, T_k) = \log_{10}(co_{ki}(T_j, T_k)+1) * idf(T_k)/\log_{10}(N_O),$$

$$\text{where: } co_{ki}(T_j, T_k) = \sum_{n=1}^{N_O} tf(T_k, n) * tf(T_j, n),$$

tf($T_k$, n)=number of occurrences of term $T_k$ in Document n in the $N_O$ documents, tf($T_j$, n)=number of occurrences of term $T_j$ in Document n in the $N_O$ documents, idf ($T_k$)=the inverted document frequency for the term $T_k$, =min(1.0, $\log_{10}(N/N_T)/5.0$)

N=the number of documents in the collection $C_O$ over which the query $Q_i$ was run, and $N_T$=the number of documents in the collection $C_O$ over which the query $Q_i$ was run, which contain the term $T_k$, The system then proceeds to a step 2130 If it is determined at the step 2130 that not all Terms $T_j$ from among the Terms in the Document $D_i$, have had their co-occurrences calculated with the Term $T_k$ from the $N_O$ documents, control returns to step 2110, and the co-occurrence of another Term $T_j$ from among the Terms in the Document $D_i$, is calculated with the Term $T_k$ from the $N_O$ documents.

If it is determined at the step 2130 that all Terms $T_j$ from the Document $D_i$, have had their co-occurrences calculated with the Term $T_k$ from the $N_O$ documents, control passes to a step 2140, at which a score $f_D(T_k)$ is calculated for the term $T_k$ with respect to the document $D_i$:

$$T_0 idf(T_j) f_D(T_k) = \Pi(\delta + C_{ni}(T_k, T_j))_{j=1}$$

where $T_j$=a term in document $D_i$, $T_0$=the number of terms in document $D_i$, idf ($T_j$) =the inverted document frequency for the term $T_j$, =min (1.0, $\log_{10}(N/N_j)/5.0$), N=the number of documents in the collection $C_O$ over which the query $Q_i$ was run, $N_j$=the number of documents in the collection $C_O$ over which the query $Q_i$ was run, which contain the term $T_j$ and δ=a constant. (In one embodiment, δ may be assigned a value of 0.01, but this value may be varied without departing from the spirit and scope of the invention.)

After $f_D(T_k)$ is calculated at the step 2140, control passes to a step 2150. If it is determined at the step 2150 that not all Terms $T_k$ from among the Terms in the $N_O$ documents have had their Scores $f_D(T_k)$ calculated for the Document $D_i$, control returns to step 2100, and the process of steps 2100-2140 is carried out for another Term $T_k$ from among the Terms in the $N_O$ documents.

If it is determined at the step 2150 that all Terms $T_k$ from among the Terms in the $N_O$ documents have had their Scores $f_D(T_k)$ calculated for the Document $D_i$, control passes to a step 2160, at which index terms are chosen for the Document $D_i$. To do so, in this embodiment the values of $f_D(T_k)$ for the Document $D_i$ are compared for the terms $T_k$ in the $N_O$ documents, and the terms $T_k$ with the highest values of $f_D(T_k)$ for the Document $D_i$ are chosen as additional terms to be added as index terms to the Document $D_i$. While the number of terms added may vary without departing from the spirit and scope of the invention, in one embodiment 30 terms are chosen to be added as index terms.

After index terms are assigned to Document $D_i$ at the step 2160, control passes to a step 2170. If it is determined at the step 2170 that not all Documents $D_i$ have had index terms assigned, control returns to step 2060, and the process of steps 2060-2160 is carried out for another Document $D_i$.

If it is determined at the step 2170 that all Documents $D_i$, have had index terms assigned, this portion of the system is completed.

The system described herein may be employed via a Web site which presents a user with, or permits a user to obtain, specific documents or lists of documents, such as Web sites, names of merchants or stores carrying merchandise in particular categories, or other documents, and which uses index terms assigned to documents to assist in the process of identifying documents for presentation to the user, or for inclusion in a list to be presented to the user.

A further aspect of the system described herein may be employed when some of the documents in the collection from which the selections) are to be made have had index terms assigned to them manually (or by other automatic methods), but index terms have not been assigned to all documents, and it is desired to assign index terms to the remaining documents automatically.

Figure 4:
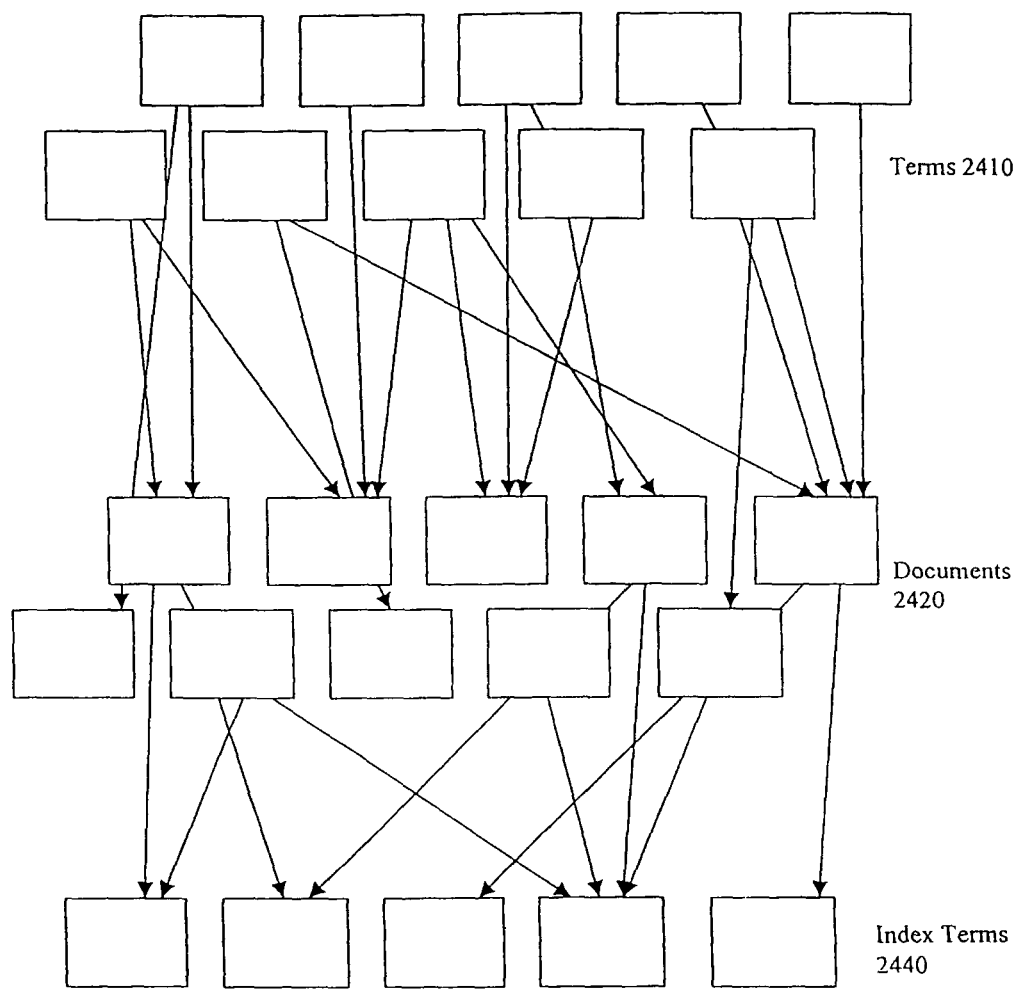
FIG. 4 illustrates a relationship between terms; documents and index terms when some but not all documents in a collection have had index terms manually assigned to them.

According to FIG. 4, in one embodiment of the system described herein, there may be a very large number of Documents D 2420 which contain Terms T 2410.

In this embodiment of the system, it is desired to assign an Index Term I 2440 or Index Terms to each Document D.

It may desirable in this embodiment of the system to associate each Document D 2420 with one and only one Index Term I 2440, or it may be desired to associate a plurality of Index Terms with a Document D.

Index Terms may be associated with Documents manually. However, manual association is time consuming and therefore costly, and this is particularly the case if the Documents and/or Index Terms may change frequently. The system described herein therefore permits Documents to be assigned Index Terms automatically, after an initial group of Documents have been assigned manually. FIG. 4 illustrates the relationship of Terms, Documents and Index Terms, when some Documents have been assigned Index Terms manually, and others have not had Index Terms assigned. (It will be understood by one of ordinary skill in the art that the system here described may also be applied where an initial group of documents have had Index Terms assigned by another automatic method, rather than manually.)

Figure 5:
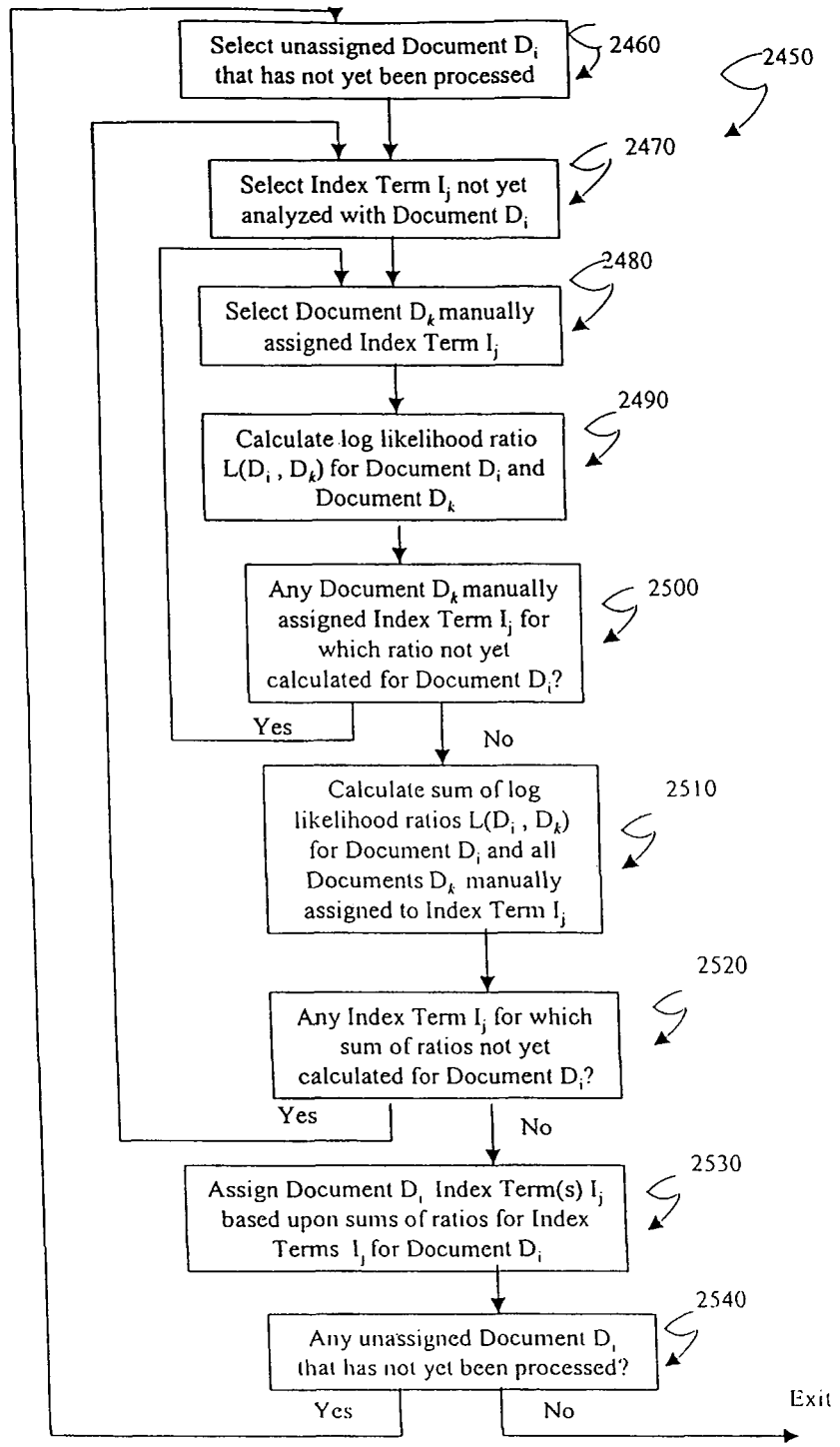
FIG. 5 is a flow chart which illustrates an overall process, according to the present invention, of automatically assigning index terms to documents, where some documents have previously had index terms assigned to them.

According to FIG. 5, the process 2450 of assigning Index Terms 2440 to Documents 2420 begins at a step 2460 in which an (as-yet-unprocessed) Document $D_i$ to which no Index Terms have been assigned manually is selected. Control then passes to a step 2470 at which an (as-yet-unanalyzed for the selected unprocessed Document $D_i$) Index Term $I_j$ is selected. (The Index Terms may consist of a set of terms chosen from among the Terms T which occur in the collection of documents, or they may be chosen independently of whether they occur among the Terms in the document collection.) Control then passes to a step 2480 at which a Document $D_k$, which has been manually assigned Index Term $I_j$ is selected.

At a step 2490, the process 2450 then calculates the log likelihood ratio L $(D_i, D_k)$:

$$L(D_i, D_k) = \log\left(\sum_{m=1}^{M_0} \prod_m(D_i, D_k) \Big/ \sum_{m=1}^{M_0} \prod_m(D_i)\right),$$

where:

$\prod_m(D_i, D_k) = 1$, if Term $m$ is in Document $D_i$ and to Document $D_k$ $= 0$ otherwise $\prod_m(D_i) = 1$, if Term $m$ is in Document $D_i$ $= 0$ otherwise $M_0$ = the number of Terms which are in Document $D_i$.

Control then passes to a step 2500, at which it is determined if there remain any further Documents $D_k$, manually assigned the Index Term $I_j$ being analyzed, for which the log likelihood ratio of that Document $D_k$ to the Document $D_i$ being processed has not yet been calculated. If any such Documents $D_k$ remain at the step 2500, control returns to the step 2480 at which a further Document $D_k$, which has had Index Term $I_j$ manually assigned to it, is chosen for calculation. If no such Documents $D_k$ remain at the step 2500, control instead passes to a step 2510 at which is calculated the total score T $(D_i, I_j)$ for the unprocessed Document $D_i$ for the Index Term $I_j$ $$T(D_i, I_j) = \sum_{k=1}^{K_0} W(D_k, I_j) * L(D_i, D_k) \Big/ \sum_{k=1}^{K_0} W(D_k, I_j),$$

where $K_0$=the number of Documents manually assigned Index Term $I_j$, $W(D_k, I_j)$=the weight assigned to Index Term $I_j$ for Document $D_k$ This system permits varying weights to be assigned to different Index Terms $I_j$ associated with a given Document D. The weights assigned to the index terms associated with a given Document D may be equal, or they may be varied to reflect the degree of importance associated with the Index Term, or they may be varied to reflect the degree of confidence with which the Index Term is believed to represent the characteristics of the document. Other reasons and methods of varying the weight assigned to an Index Term associated with a Document will be apparent to one of ordinary skill in the art.

In the case where each Document D has assigned to it only a single Index Term In, then $W(D_k, I_j) = 1$ for the one and only one Index Term $I_j$ assigned to Document $D_k$, and the formula for the total score T $(D_i, I_j)$ is simplified:

$$T(D_i, I_j) = \sum_{k=1}^{K_0} L(D_i, D_k)/K_0,$$

where $K_0$=the number of Documents manually assigned Index Term $I_j$.

Control then passes to a step 2520, at which it is determined if there remain any further Index Terms $I_j$ for which total scores T $(D_i, I_j)$ have not yet been calculated for the Document $D_i$ being processed. If any such Index Terms $I_j$ remain at the step 2520, control returns to the step 2470 at which a further Index Term $I_j$ is chosen for analysis with the Document $D_i$. If no such Index Terms $I_j$ remain at the step 2520, control instead passes to a step 2530 at which an Index Term or Index Terms are selected to be associated with the Document $D_i$ being processed.

In one embodiment of the system, a single Index Term $I_M$, whose total score T $(D_i, I_j)$ for the Document $D_i$ being processed is the highest, is selected as the index term for Document $D_i$. In another embodiment of the system, a predetermined number R of Index Terms may be selected as index terms for Document $D_i$. In this embodiment, the R Index Terms with the highest total scores T $(D_i, I_j)$ are selected. In another embodiment, all Index Terms whose total scores T $(D_i, I_j)$ exceed a predetermined cutoff score $T_0$ are selected as index terms for Document $D_i$. (In any of these embodiments, if no co-occurrences were found between the Document $D_i$ being processed and any document which has been manually assigned index terms, then no index terms are assigned to the Document $D_i$.)

Figure 6:
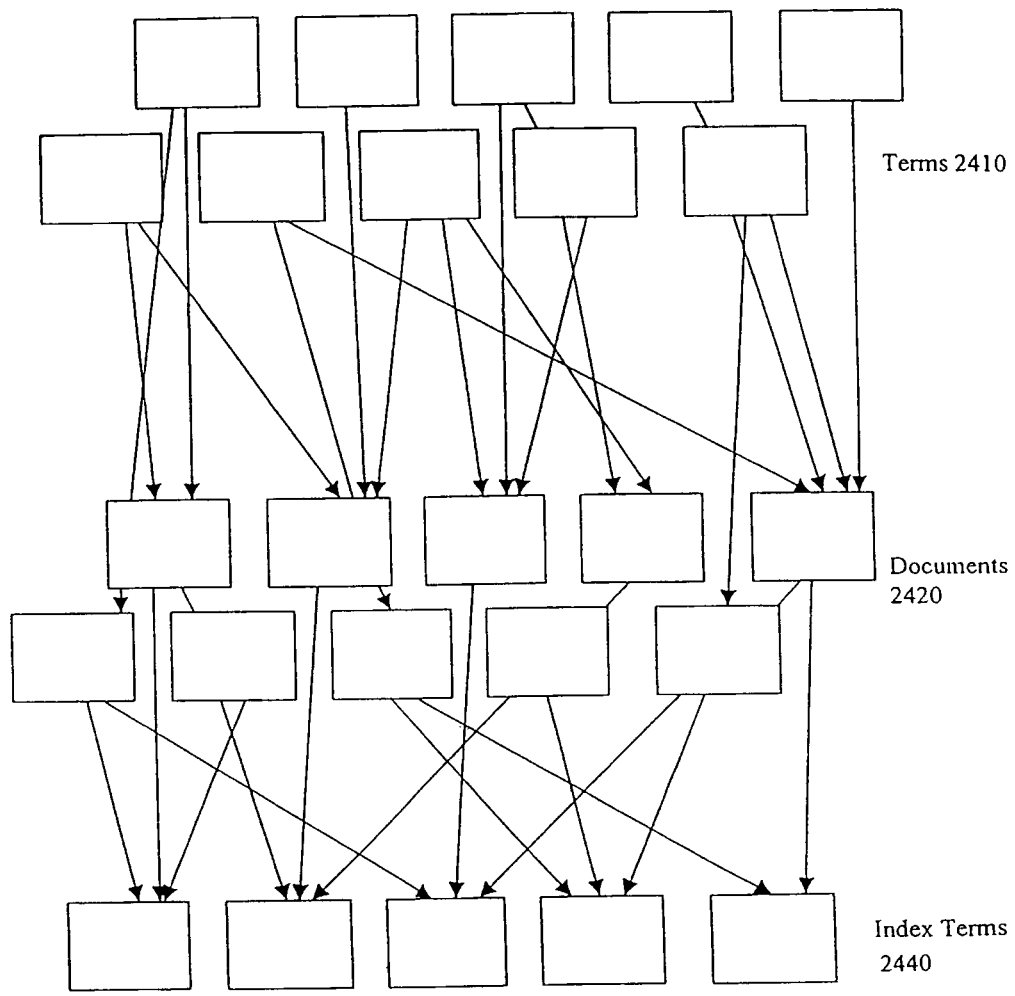
FIG. 6 illustrates a relationship between terms, documents and index terms after documents in a collection have had index terms assigned to them automatically

Control then passes to a step 2540 at which it is determined if there remain any further Documents $D_i$, which were not assigned index terms manually, which have not yet been processed. If any such unprocessed Documents $D_i$ remain at the step 2540, control returns to the step 2460 at which a further as-yet-unprocessed Document $D_i$ is chosen for processing. If no such unprocessed Documents $D_i$ remain at the step 2540, the process 2450 is concluded, and each Document $D_i$, to which no Index Terms had been assigned manually, either has been assigned Index Terms or has been found not to have co-occurrences with any Document which had index terms manually assigned to it. According to FIG. 6, when the process 2450 has been completed, Index Terms 2440 will have been assigned to Documents 2420 containing Terms 2410, except for Documents 2420 which could not be assigned Index Terms 2440 because they lack any co-occurrences with any Document 2420 which had Index Terms 2440 manually assigned to it.

The system described herein may be utilized in one embodiment in connection with the assignment of categories consisting of items of interest into categories of categories, or supercategories.

In this embodiment, an item of interest may be considered to be a merchant, store or other source for a product or service, or a number of (related or unrelated) products or services. Each variety of product or service may be considered to be a category (such as, for example, "Auto Dealers, Used Cars/"). In this embodiment, items of interest (merchants or stores, such as, for example, "Lannan Chevrolet, Oldsmobile") may be assigned to more than one category (variety of product or service).

In this embodiment, it is desired to present categories to a user in response to his request. The categories presented to the user may vary, depending on a term or terms (such as, for example, "automobiles, used") specified by the user in the request. The categories presented may be chosen by any one of a number of techniques that will be familiar to one of ordinary skill in the art.

In this embodiment of the system described herein, it is desired to present additional material to a user who is searching for items of interest. For example, it may be desired to present the user with banner advertisements (such as for automobile financing sources) which relate to the item of interest (such as used cars) for which he is searching.

Figure 7:
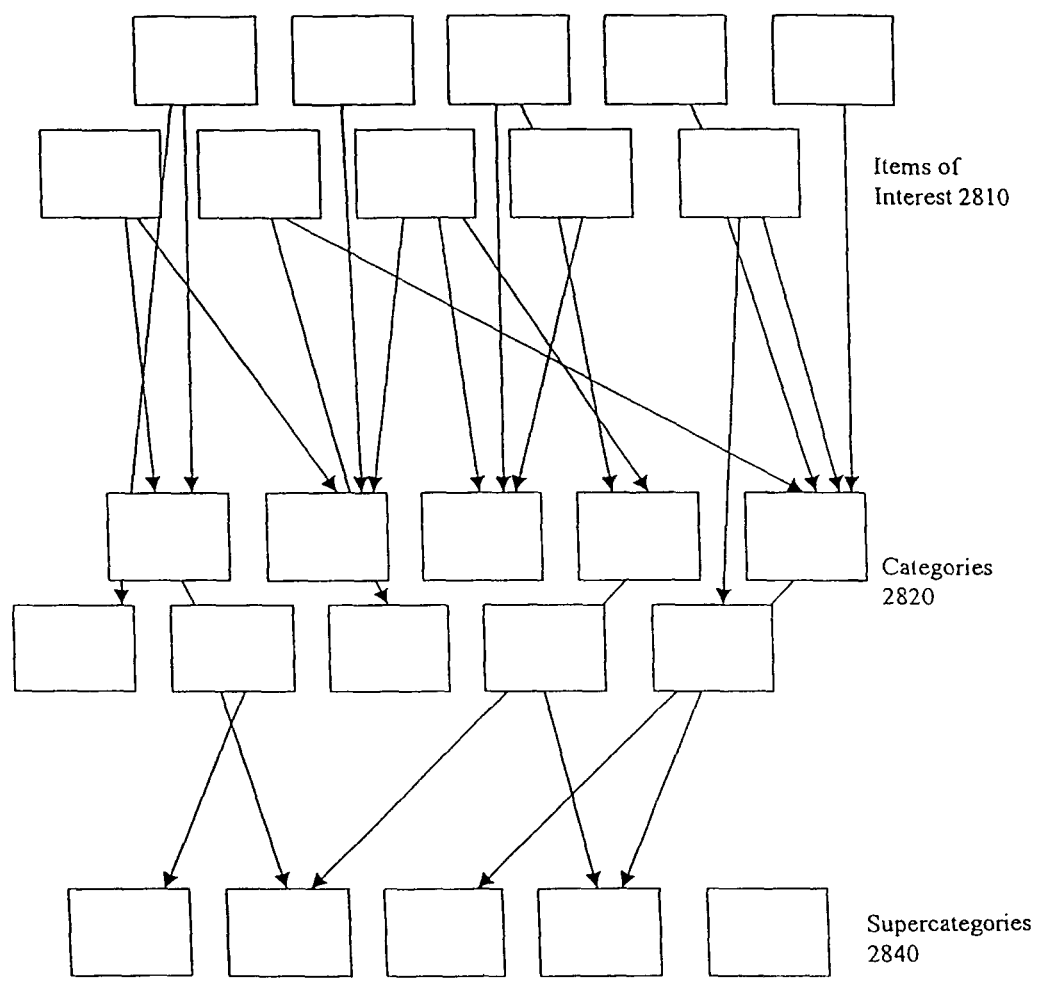
FIG. 7 illustrates a relationship between items of interest, categories and supercategories when some but not all categories in a collection have been manually assigned to supercategories.

According to FIG. 7, in one embodiment of the system described herein, there may be a very large number of individual items of interest 2810 to be organized into categories 2820 for presentation. While the number may vary without departing from the spirit and scope of the invention, there may be about 20,000 categories.

In this embodiment of the system, it is desired to choose a banner advertisement to present to a user The banner advertisements in turn may be divided into categories 2840. While the number may vary without departing from the spirit and scope of the invention, there may be about 50 categories 2840 into which the banner advertisements may be divided. (To avoid confusion with the categories into which the items of interest are divided, these banner advertisement categories 2840 are referred to herein as "supercategories." 2840)

It is desirable in this embodiment of the system to associate each category 2820 of items of interest 2810 with one and only one supercategory 2840 of banner advertisements, such that when a user is accessing that category 2820 of item he is presented with banner advertisements from the corresponding supercategeory 2840. (For example, in one embodiment the category "Auto Dealers, Used Cars" may be assigned to a supercategory also comprising other categories related to automobiles, such as "Automobile Dealers" and/or "Auto Repair & Service.")

Categories may be associated with supercategories manually. However, manual association is time consuming and therefore costly, and this is particularly the case if the categories and supercategories may change frequently. This embodiment of the system described herein therefore permits categories to be assigned to supercategories automatically, after an initial group of categories have been assigned manually. FIG. 7 illustrates the relationship of items of interest categories and supercategories, when some categories have been assigned to supercategories, and others remain unassigned. While the number may vary without departing from the spirit and scope of the invention, in one embodiment there may be about 2,000 categories manually assigned to supercategories.

Figure 8:
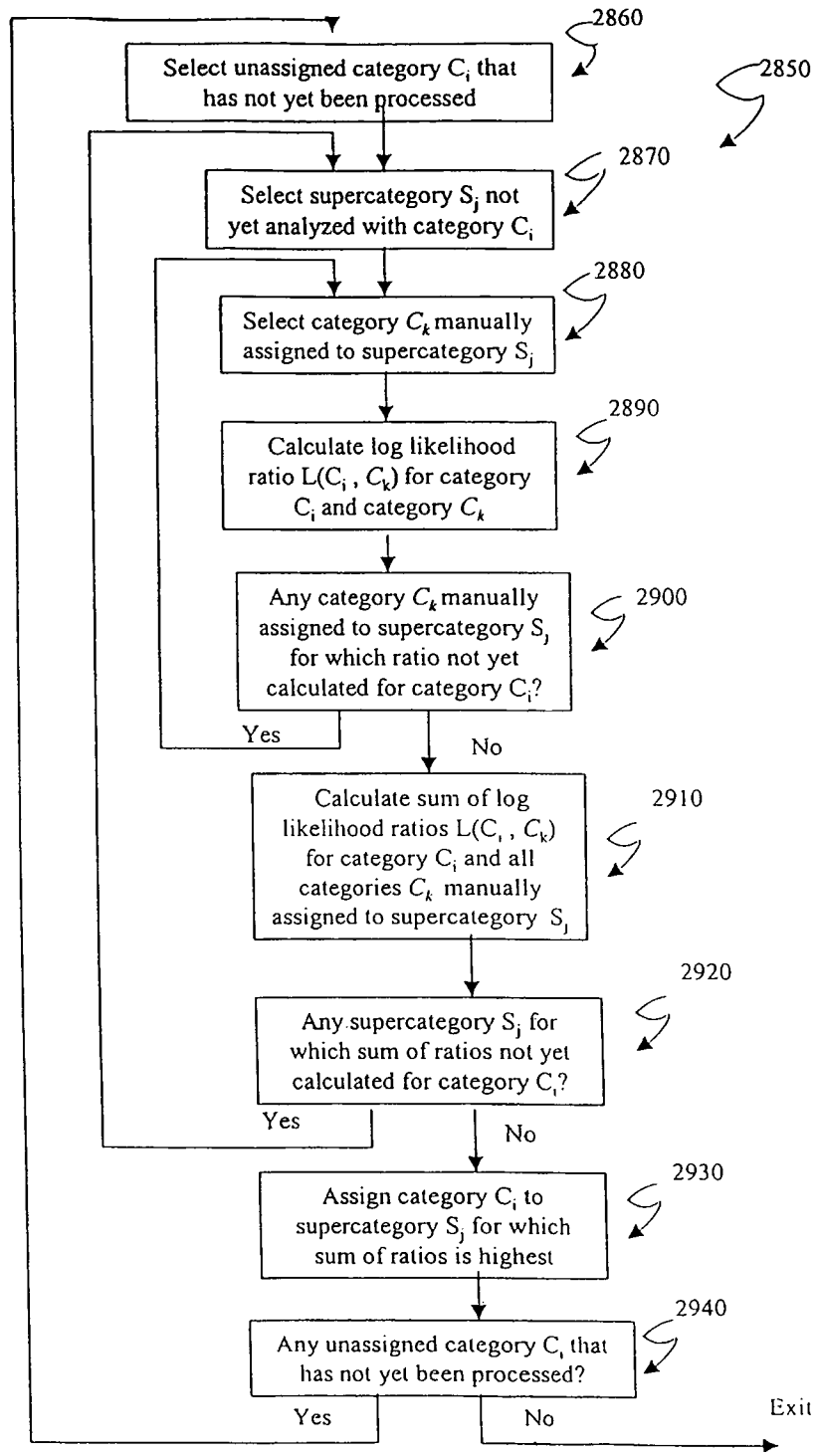
FIG. 8 is a flow chart which illustrates an overall process, according to the present invention, of automatically assigning categories to supercategories, where some categories have previously been assigned to supercategories.

According to FIG. 8, the process 2850 of assigning categories 2820 to supercategories in this embodiment of the system 2840 begins at a step 2860 in which an (as-yet-unprocessed) unassigned category $C_i$ is selected. Control then passes to a step 2870 at which an (as-yet-unanalyzed for the selected unassigned category) supercategory $S_j$ is selected. Control then passes to a step 2880 at which a category $C_k$, which has been manually assigned to supercategory $S_j$ is selected.

At a step 2890, the process 2850 then calculates the log likelihood ratio $L(C_i, C_k)$:

$$L(C_i, C_k) = \log\left(\sum_{m=1}^{M_0} \Pi_m(C_i, C_k) \Big/ \sum_{m=1}^{M_0} \Pi_m(C_i)\right),$$

where:

$\Pi_m(C_i, C_k) = 1$, if item of interest m is assigned to category $C_i$ and to category $C_k$ $\Pi_m(C_i) = 0$ otherwise $\quad = 1$, if item of interest $m$ is assigned to category $C_i$ $\quad = 0$ otherwise $M_0 = $ the number of items of interest which are assigned to category $C_i$ Control then passes to a step 2900, at which it is determined if there remain any further categories $C_k$, manually assigned to the supercategory $S_j$ being analyzed, for which the log likelihood ratio of that manually assigned category $C_k$ to the category being processed $C_i$, has not yet been calculated. If any such manually assigned categories $C_k$ remain at the step 2900, control returns to the step 2880 at which a further manually assigned category $C_k$ is chosen for calculation. If no such manually assigned categories $C_k$ remain at the step 2900, control instead passes to a step 2910 at which is calculated the total score $T(C_i, S_j)$ for the unprocessed category $C_i$ for the supercategory $S_j$:

$$T(C_i, S_j) = \sum_{k=1}^{K_0} L(C_i, C_k)/K_0,$$

where $K_0 = $ the number of categories manually assigned to supercategory $S_j$ Control then passes to a step 2920, at which it is determined if there remain any further supercategories $S_j$ for which total scores $T(C_i, S_j)$ have not yet been calculated for the category $C_i$ being processed. If any such supercategories $S_j$ remain at the step 2920, control returns to the step 2870 at which a further supercategory $S_j$ is chosen for analysis with the category $C_i$. If no such supercategories $S_j$ remain at the step 2920, control instead passes to a step 2930 at which is selected a supercategory $S_M$ whose total score $T(C_i, S_j)$ for the category $C_i$ being processed is the highest. The category being processed $C_i$ then is assigned to the supercategory $S_M$. (If no co-occurrences have been found between the category $C_i$ being processed and any category manually assigned to a supercategory, the category $C_i$ being processed is not assigned to any supercategory.)

Figure 9:
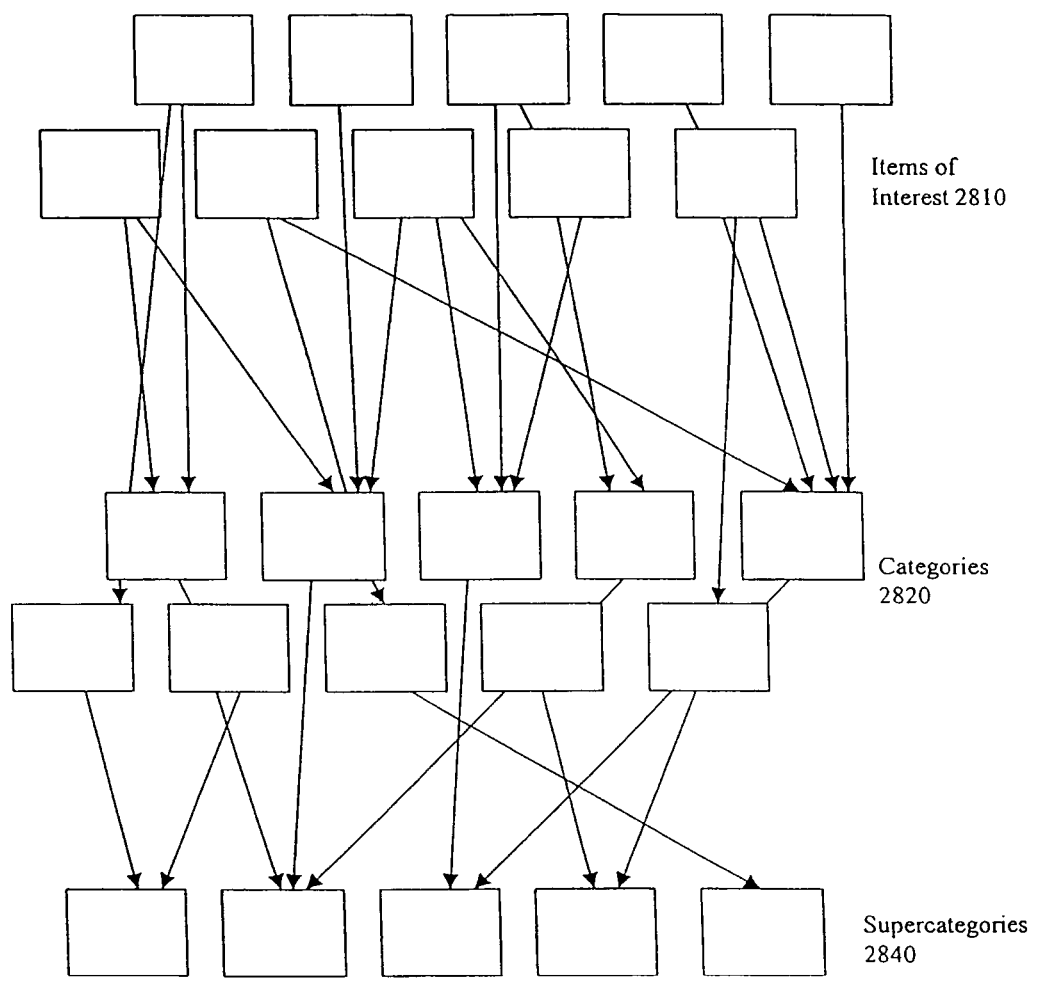
FIG. 9 illustrates a relationship between items of interest, categories and supercategories when categories in a collection have been assigned to supercategories.

Control then passes to a step 2940 at which it is determined if there remain any further unassigned categories $C_i$ not yet processed. If any such unprocessed categories $C_i$ remain at the step 2940, control returns to the step 2860 at which a further as-yet-unprocessed category $C_i$ is chosen for processing. If no such unprocessed categories $C_i$ remain at the step 2940, the process 2850 is concluded, and each previously-unassigned category $C_i$ has either been assigned to a supercategory $S_j$, or it has been determined that it has no co-occurrences with any manually-assigned category, and hence no supercategory $S_j$ assignment has been made for it. According to FIG. 9, all categories 2820 containing items of interest 2810 will have been assigned to supercategories 2840, except for those categories 2820 as to which it has been determined that the category 2820 has no co-occurrences with any manually-assigned category 2820.

When additional terms such as index terms or key words are assigned to a document, such as by the system described herein, the additional terms may be considered as terms along with the terms that occur in the document itself for purposes of calculating term frequency scores. The original terms and the index terms may be used together in searches, or the index terms alone may be used.

It may be thought that the occurrence among the additional terms of a term for which a search is being made may be more or less important as a predictor of the utility of the document than the occurrence of a term found in the document itself. A technique for taking into account whether a term occurs in a document itself or among the additional terms associated with the document, in the calculation of a term frequency score for that document, therefore may be useful.

In addition, documents in a collection which is being searched may consist of various segments or sections. The segments or sections may include a title, an abstract or introduction or summary, captions, and footnotes. Other sections or segments into which a document may be divided will be apparent to one of ordinary skill in the art.

In some circumstances, it may be thought that the occurrence of a term in one segment of a document may be more predictive of the utility of that document than its occurrence in another segment. A technique for taking into account the segment of a document in which a given term occurs, in the course of calculating a term frequency score for that document, therefore may be useful.

According to the system being described herein, a weight $W_{SD}$ may be assigned to each segment $S_i$ of a document D containing $S_0$ segments. In one embodiment of the system:

$$\sum_{S_1=1}^{S_0} W_{SD} = 1.$$

In one embodiment of the system, an entire document itself is considered a single segment, and the additional index terms associated with the document, such as by the system described herein, are considered a second segment. In that embodiment, there are a total of two segments in a document, including the new segment containing the index terms.

In a further embodiment of the system, the index terms associated with the document, such as by the system described herein, are considered a segment, and the text of the document itself may be divided into a number of separate segments which may include a title, at abstract or introduction or summary, captions, and footnotes. Other sections or segments into which a document may be divided will be apparent to one of ordinary skill in the art.

In a further embodiment of the system, where additional terms such as index terms have been associated with a document by more than one method, for each method used the additional terms associated with the document by that method may be considered a separate segment of the document.

In a further embodiment of the system, where no additional terms have been associated with the document, the text of the document itself may be divided into a number of separate segments which may include a title, an abstract or introduction or summary, captions, and footnotes.

The weights $W_{SD}$ assigned to the segments of documents may be chosen arbitrarily.

In one embodiment of the system, the weights $W_{SD}$ assigned to the segments $S_i$ of a document D may be individually determined in advance, based upon a decision about the relative utility of various segments of the document D in determining the relevance of the document under various criteria.

In an embodiment of the system, a given segment $S_i$ may be required to have equal weight $W_{SD}$ in all documents.

In a further embodiment, the weight $W_{SD}$ of a given segment $S_i$ of different documents may be different, based upon the relative utility of that segment of each document in predicting whether that document will be of interest to a user.

The weights assigned to the segments $S_I$ of a document containing the additional terms assigned to the document may be varied based upon the method used to assign the additional terms, and the degree to which the additional terms are considered to be highly related to the content of the documents. In an embodiment of the system, a segment $S_I$ may be required to have equal weight $W_{SD}$ in all documents. In a further embodiment, the weights $W_{SD}$ of the segments $S_I$ of different documents may be different, based upon the method used to assign the additional terms, and the degree to which the additional terms are considered to be highly related to the content of each document.

In one embodiment of the system, the weights $W_{SD}$ are varied depending on the results of experiments which vary the weights for test searches and evaluate the utility of the results returned, either in terms of precision (the ability of the search formula to avoid returning documents that are not useful), or of recall (the ability of the search formula to avoid omitting documents that are usefull), or of a combination of the two.

When it is determined to calculate a term frequency score under a given search query Q for a document D with $S_0$ segments in the collection of documents $C_0$ being searched under the system, a generalized term frequency score may be calculated as follows:

$$S_D = \sum_{T=1}^{T_0} \sum_{S_i=1}^{S_0} TF_{STD}$$

where: $S_D$ is the total score for the document D,

To is the number of terms which occur in the search query Q, and $TF_{STD}$ is the score for document D based on the occurrence of term T in segment $S_i$ of document D.

In one embodiment of the system, scores are assigned to documents utilizing Robertson's term frequency score, and the generalized term frequency score $S_D$ for a document D may be calculated as follows:

$$S_D = \sum_{T=1}^{T_0} \sum_{S_i=1}^{S_0} TF_{STD} * IDF_{ST}$$

where:

$S_D$ is the total score for the document $D$, $T_0$ is the number of terms which occur in the search query $Q$, $S_0$ is the number of segments in the document $D$, $TF_{STD}$ = Robertson's generalized term frequency score for Term $T$ in Segment $S_i$ of Document $D = G_{STD} / (G_{STD} + K_1 + K_2 * W_{SD} * (H_{SD} / H_{SO}))$, where:

$G_{STD}$ = the generalized term count for Term $T$ in Segment $S_1$ of Document $D$, $= W_{SD} * W_{STD} * N_{STD}$, where:

$W_{SD}$ is the weight assigned to segment $S_i$ of document D, $W_{STD}$ is the weight assigned to term T in segment $S_i$ of document D, and $N_{STD}$ is the number of times the term T occurs in segment $S_i$ of document D, $H_{SD}$ = the generalized length of segment $S_i$ of document $D$, $$H_{SD} = \sum_{T=1}^{L_{SD}} W_{STD} * N_{STD}$$

where: $L_{SD}$ is the number of different terms in segment $S_i$ of document $D$, $H_{SO}$ = the generalized average length of segment $S_i$ of documents in the collection $C_0$ being searched, $$H_{SO} = \sum_{N=1}^{N_0} (W_{SD} * H_{SD}) \bigg/ \sum_{N=1}^{N_0} W_{SD},$$

where: $N_0$ is the number of documents in the collection $C_0$, and $K_1$ and $K_2$ are constants (In one embodiment, $K_1$ may be assigned a value of 0.5, and $K_2$ 1.5, but these values may be varied without departing from the spirit and scope of the invention.)

In this system, $IDF_{ST}$=the generalized inverted document frequency for term T, $$IDF_{ST} = \log((N_0 + K_2)/N_{ST})\log(N_0 + K_4)$$

where:

$N_0$ is the number of documents in the collection $C_0$ $N_{ST}$ is the number of documents in the collection $C_0$ containing the term T in the segment $S_i$, $K_3$ and $K_4$ are constants. (In one embodiment, $K_3$ may be assigned a value of 0.5, and $K_4$ 1.0, but these values may be varied without departing from the spirit and scope of the invention.)

In one embodiment of the system/ each segment $S_i$ of a document D consists of a portion of the text of the document D, and there are no segments containing index terms. In this embodiment, the weights $W_{STD}$ assigned to terms T in the segments $S_i$ of the document D are equal. In this embodiment, the factors $W_{STD}$, the weights assigned to terms T in segment $S_i$ of document D, may all be considered to be equal to 1.0, and the formula simplifies to:

$$S_D = \sum_{T=1}^{T_0} \sum_{S_i=1}^{S_0} TF_{STD} * IDF_{ST}$$

where:

$TF_{STD}$ = Robertson's generalized term frequency score for Term $T$ in Segment $S_i$ of Document $D$ $= G_{STD} / (G_{STD} + K_1 + K_2 * W_{SD} * (H_{SD}/H_{SO}))$, -continued where:

$G_{STD}$ = the generalized term count for Term $T$ in Segment $S_1$ of Document $D$, $= W_{SD} * N_{STD}$ $$H_{SD} = \sum_{T=1}^{L_{SD}} N_{STD}$$

$$H_{SO} = \sum_{N=1}^{N_0} (W_{SD} * H_{SD}) \bigg/ \sum_{N=1}^{N_0} W_{SD},$$

$IDF_{ST} = \log((N_0 + K_3)/N_{ST})/\log(N_0 + K_4)$

In this embodiment, if the document has only a single segment, then $W_{SD}$ may be considered to be equal to 1.0 for that segment, and the formula further reduces to:

$$S_D = \sum_{T=1}^{T_0} TF_{TD} * IDF_T$$

where:

$TF_{STD}$ = Robertson's generalized term frequency score for Term $T$ in Segment $S_i$ of Document $D$ $= G_{TD} / (G_{TD} + K_1 + K_2 * (H_D/H_O))$, where:

$G_{TD}$ = the generalized term count for Term $T$ in Segment $S_1$ of Document $D$, $= N_{TD}$ $$H_D = \sum_{T=1}^{L_D} N_{TD}$$

$$H_O = \sum_{N=1}^{N_0} (H_D)/N_0,$$

$IDF_{ST} = \log((N_0 + K_3)/N_T)/\log(N_0 + K_4)$

This is the conventional Robertson's term frequency score for an unsegmented text document.

In another embodiment of the system, in which a segment $S_I$ of a document D contains index terms automatically associated with the document D according to the system, the weight $W_{STD}$ assigned to an index term $T_n$ in segment $S_I$ of a document D is $$W_{STD} = f_D(T_n) \bigg/ \sum_{T=1}^{L_{SD}} f_D(T_t),$$

where $f_D(T_n)$ has the value set forth above, and $L_{SD}$ is the number of index terms in segment $S_I$ of document D.

In this embodiment of the system, other segments of a document D may contain the text of the document D itself, or portions of the text, or other index terms associated with the document by other methods.

In the embodiment of the system in which only the index terms automatically associated with the document by the system are utilized to carry out a search query, the formula for the score assigned to a document according to the system reduces to the following:

$$S_D = \sum_{T=1}^{T_0} TF_{TD} * IDF_T$$

where:

$S_D$ is the total score for the document $D$, $T_0$ is the number of terms which occur in the query $Q$, $TF_{TD}$ = Robertson's generalized term frequency score for Term $T$ of Document $D = G_{TD}/(G_{TD} = K_1 + K_2)$, where:

$G_{TD}$ = the generalized term count for Term $T$ of Document $D$, $f_D(T_n)$

In this embodiment, because the weights assigned to the index terms in a document are normalized, the "length" of every document is 1.0, and the denominator of Robertson's term frequency score considerably simplifies.

In a further embodiment of the system described herein, it is desired to present further information to a user who has visited a Web site; when the Web site has permitted the user to enter terms describing an item of interest to the user. In this embodiment, an item of interest may be considered to be a product or service, or a number of (related or unrelated) products or services. In response to the user providing terms related to the product(s) or service(s) which he is seeking (such as, for example, "automobiles, used"), the Web site may display for the user a list of categories. Each category (such as, for example, "Auto Dealers, Used Cars") may contain information about merchants, stores or other sources (such as, for example, "Lannan Chevrolet, Oldsmobiles") for a particular variety of products or services which may relate to the product(s) or service(s) which the user is seeking. In this embodiment, merchants or stores who carry products or services may be assigned to more than one category (variety of product or service). The user then may select a particular category from the list of categories displayed to him, and the items of interest (merchants or stores) in that category will be displayed for him.

In this embodiment of the system described herein, it is desired to present additional material to a user who is searching for particular products or services, in addition to the list of categories which contain merchants or stores who may carry the desired product or service. For example, it may be desired to present the user with banner advertisements, such as for automobile financing, which relate to the product or service, such as automobiles, for which he is searching.

In one embodiment of the system described herein, there may be a very large number of individual merchants or stores to be organized into categories of products or services for presentation.

In this embodiment of the system, there are fewer categories of products or services than individual merchants or stores. While the number may vary without departing from the spirit and scope of the invention, in one embodiment of the system there may be about 20,000 categories. Each category has associated with it a set of terms (such as, for example, "Auto Dealers, Used Cars") which describe the product(s) or service(s) which the merchants, stores or other sources associated with the category may provide. Each category further has associated with it a category identifier term which is unique to it, and serves to identify the category.

In this embodiment of the system, it is desired to choose a banner advertisement to present to a user The banner advertisements in turn may be divided into categories. While the number may vary without departing from the spirit and scope of the invention, there may be about 50 categories into which the banner advertisements may be divided. (To avoid confusion with the categories into which the items of interest are divided, these banner advertisement categories will be referred to hereafter as "supercategories.")

Figure 10:
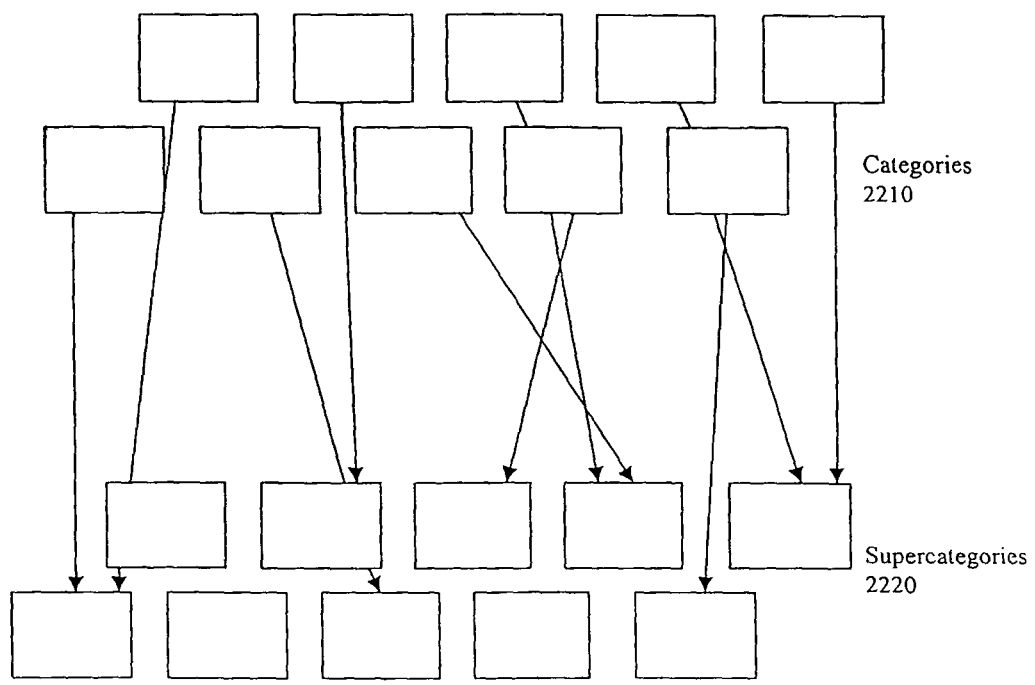
FIG. 10 illustrates a relationship between categories and supercategories.

As illustrated by FIG. 10, it is desirable in this embodiment of the system to assign each category 2210 of merchants or stores to one and only one supercategory 2220 of banner advertisements. In this embodiment of the system, each supercategory has associated with it the sets of terms (such as, for example, "Auto Dealers, Used Cars") which describe the product(s) or service(s) which the merchants, stores or other sources associated with the categories assigned to it may provide. Each supercategory further has associated with it the category identifier terms which are unique to the categories assigned to it.

Figure 11:
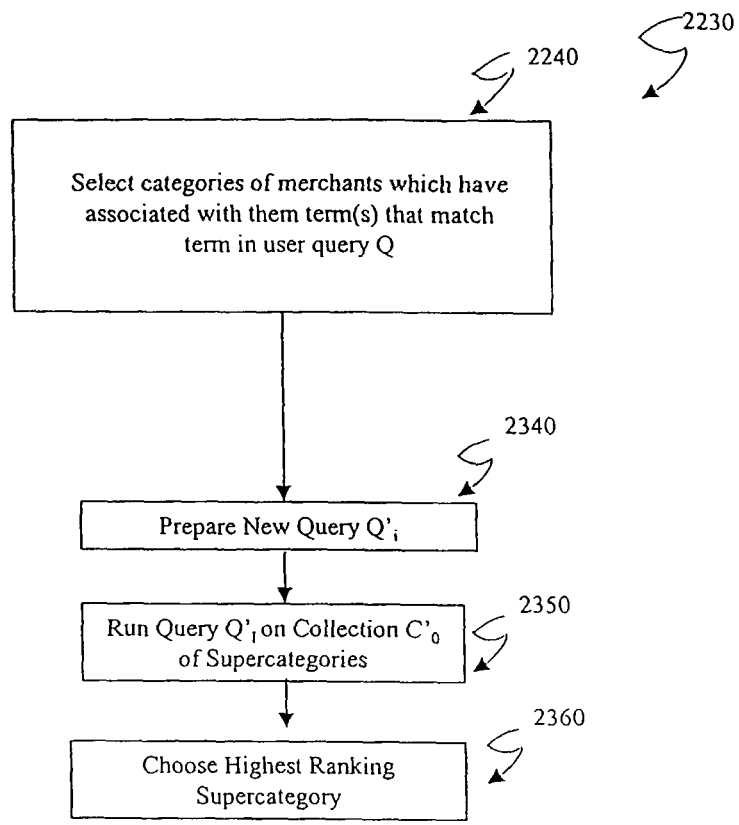
FIG. 11 is a flow chart which illustrates a process, according to the present invention, of assigning a supercategory to a query.

According to FIG. 11, this method 2230 proceeds first at a step 2240 to select every category $C_i$ of merchants or stores 2210 which has associated with it a term or terms (such as, for example, "Auto Dealers, Used Cars") describing the product(s) or service(s) which the merchants, stores or other sources associated with the category may provide, that matches any term or terms in the user query $Q_i$ (such as "automobiles, used").

After every such category $C_i$ of merchants or stores 2210 is selected at the step 2240, control passes to a step 2340. At the step 2340, a new Query $Q'_i$ is prepared, consisting of the original user Query $Q_i$ with the addition of all terms which describe the product(s) or service(s) which the merchants, stores or other sources associated with the said categories $C_i$ may provide, and with the further addition of the unique category identifier terms $T_i$ which identify the categories $C_i$.

After the new Query $Q'_i$ is prepared at the step 2340, control passes to a step 2350, at which the new Query $Q'_i$ is run, on the collection $C'_o$ of supercategories 2220. There are a number of methods of running the query $Q'_i$ on the collection $C'_o$ of supercategories 2220, which will be known to one of ordinary skill in the art.

In one embodiment the query is run by utilizing Robertson's term frequency score, where the score for a supercategory $S_c$ is determined by:

$$S_D = \sum_{T=1}^{T_0} TF_{TD} * IDF_T$$

where: $T_0$ is the number of terms which occur in the query $Q'_i$, $TF_{TD}$ is Robertson's term frequency for term $T$ in supercategory $S_c$, $= N_{TC}/(N_{TC} + K_1 + K_2 * (L_C/L_0))$, where: $N_{TC}$ is the number of times the term $T$ occurs in supercategory $S_C$, $L_C$ is the length of supercategory $S_c$, $L_0$ is the average length of a supercategory, and $K_1$ and $K_2$ are constants and $IDF_T = \log((N + K_3)/N_T)/\log(N + K_4)$ where:

N is the number of supercategories in the collection $N_T$ is the number of supercategories containing the term T, and $K_3$ and $K_4$ are constants.

In another embodiment of the system, the categories have been assigned to supercategories by a combination of methods. In this embodiment, a certain number of the categories may have been assigned to supercategories manually, while the remainder may have been assigned to supercategories utilizing a variety of automatic or semi-automatic index term augmentation techniques. While the number of categories assigned manually may vary without departing from the spirit and scope of the invention, and the number and type of automatic and semi-automatic index term augmentation techniques utilized may vary without departing from the spirit and scope of the invention, in one embodiment about 2,000 out of about 20,000 categories are assigned manually and the remainder by the semi-automatic technique of this system, which utilizes the co-occurrence of terms between the categories assigned manually and an unassigned category to help assign the unassigned categories.

In one embodiment of the system, it is further desired in evaluating queries $Q'_i$ and selecting a supercategory to assign differing weights to the terms and term identifiers associated with categories, depending on whether the category has been manually assigned to a supercategory, or assigned automatically or semi-automatically. While the weights thus assigned may vary without departing from the spirit and scope of the invention, in one embodiment the terms and term identifiers associated with categories manually assigned to supercategories are assigned a weight of 1.0, while the terms and term identifiers associated with categories assigned to supercategories by the semi-automatic method of the system described herein which utilizes the co-occurrence of terms between the manually-assigned categories and an unassigned category to help assign the unassigned categories are assigned a weight of 0.4.

In this embodiment, in order to evaluate the query $Q'_i$ the supercategories are considered to comprise multiple segments. In one segment are the terms and term identifiers associated with the categories assigned to the supercategory manually, while each of the other segments comprises the terms and term identifiers associated with the categories assigned to the supercategory by a particular automatic or semi-automatic method. In this embodiment the generalized term frequency score for a supercategory SC with respect to the query $Q'_i$ may be calculated as follows:

$$S_C = \sum_{T=1}^{T_0} \sum_{S_i=1}^{S_0} TF_{STC} * IDF_{ST}$$

where:

$S_c$ is the total score for the supercategory $S_c$, $T_0$ is the number of terms which occur in the query $Q'_i$, $S_0$ is the number of segments in the supercategory $S_c$, $TF_{STC}$ = Robertson's generalized term frequency score for Term $T$ in Segment $S_i$ of supercategory $S_c$ $= G_{STC} / (G_{STC} + K_1 + K_2 * W_{SC} * (H_{SC} / H_{SO}))$, where:

$G_{STC}$ = the generalized term count for Term $T$ in Segment $S_i$ of supercategory $S_c$,
$= W_{SC} * W_{STC} * N_{STC}$, where:

$W_{SC}$ is the weight assigned to segment $S_i$ of the supercategories, $W_{STC}$ is the weight assigned to term $T$ in segment $S_i$ of supercategory $S_C$, and $N_{STC}$ is the number of times the term $T$ occurs in segment $S_i$ of supercategory $S_C$, $H_{SC}$ = the generalized length of segment $S_i$ of supercategory $S_C$, $$H_{SC} = \sum_{T=1}^{L_{SC}} W_{STC} * N_{STC}$$

where:

$L_{SC}$ is the number of different terms in segment $S_i$ of supercategory $S_C$, $H_{SO}$=the generalized average length of segment $S_i$ of the supercategories, $$H_{SO} = \sum_{C=1}^{C_0} (W_{SC} * H_{SC}) / \sum_{C=1}^{C_0} W_{SC},$$

where: $C_0$ is the number of supercategories and $K_1$ and $K_2$ are constants (In one embodiment, $K_1$ nay be assigned a value of 0.5, and $K_2$ 1.5, but these values may be varied without departing from the spirit and scope of the invention.)

In this system, $IDF_{ST}$=the generalized inverted document frequency for term T, $IDF_{ST}=\log((C_0+K_3)/C_{ST})/\log(C_0+K_4)$ where:

$C_0$ is the number of supercategories $C_{ST}$ is the number of supercategories containing the term T in the segment $S_i$, $K_3$ and $K_4$ are constants. (In one embodiment, $K_3$ may be assigned a value of 0.5, and $K_4$ 1.0, but these values may be varied without departing from the spirit and scope of the invention.)

In the embodiment of the system in which the terms and term identifiers associated with categories manually assigned to a supercategory are assigned a weight of 1.0, and are assigned to one segment of the supercategory, while the terms and term identifiers associated with categories assigned to the supercategory by the semi-automatic method of the system described herein, which utilizes the co-occurrence of terms between the manually-assigned categories and an unassigned category to help assign the unassigned categories, are assigned to the other segment of the supercategory, and are assigned a weight of 0.4, the generalized term frequency score for a supercategory $S_C$ with respect to the query $Q'_i$ may be calculated as follows, where all terms in a segment are assigned equal weight $W_{STC}$:

$$S_C = \sum_{T=1}^{T_0} \sum_{S_i=1}^{2} TF_{STC} * IDF_{ST}$$

where:

$S_C$ is the total score for the superategory $S_C$, $T_0$ is the number of terms which occur in the query $Q'_i$, $TF_{STC}$ = Robertson's generalized term frequency score for Term $T$ in Segment $S_i$ of supercategory $S_C$ $= G_{STC} / (G_{STC} + K_1 + K_2 * W_{SC} * (H_{SC} / H_{SO}))$, where:

$G_{STC}$ = the generalized term count for

Term $T$ in Segment $S_i$ of supercategory $S_C$, $= W_{SC} * N_{STC}$, where:

$W_{SC}$, the weight assigned to segment $S_i$ of the supercategories, $W_{SC}$=1.0 for the segment which comprises the terms and term identifiers associated with the categories manually assigned to the supercategory $S_i$, $W_{SC}$=0.4 for the segment which comprises the terms and term identifiers associated with the categories assigned to the supercategory $S_i$ by the semi-automatic method of the system described herein, which utilizes the co-occurrence of terms between the manually-assigned categories and an unassigned category to help assign the unassigned categories, and $N_{STC}$ is the number of times the term T occurs in segment $S_i$ of supercategory $S_c$, $H_{SC}$=the generalized length of segment $S_i$ of supercategory $S_c$, $$H_{SC} = \sum_{T=1}^{L_{SC}} N_{STC}$$

where:

$L_{SC}$ is the number of different terms in segment $S_i$ of supercategory $S_c$, $H_{SO}$=the generalized average length of segment $S_i$ of the supercategories, $$H_{SO} = \sum_{C=1}^{C_0} (W_{SC} * H_{SC}) / \sum_{C=1}^{C_0} W_{SC},$$

where: $C_0$ is the number of supercategories
and $K_1$ and $K_2$ are constants (In one embodiment, $K_1$ may be assigned a value of 0.5, and $K_2$ 1.5 but these values may be varied without departing from the spirit and scope of the invention.)

In this system, $IDF_{ST}$=the generalized inverted document frequency for term T, $IDF_{ST} = \log((C_0 + K_2)/C_{ST})/\log(C_0 + K_4)$ where:

$C_0$ is the number of supercategories $C_{ST}$ is the number of supercategories containing the term T in the segment $S_i$, $K_3$ and $K_4$ are constants. (In one embodiment, $K_3$ may be assigned a value of 0.5, and $K_4$ 1.0, but these values may be varied without departing from the spirit and scope of the invention.)

After the new Query $Q'_i$ is run on the collection $C'_o$ of supercategories 2220 at the step 2350, control passes to a step 2360, at which the supercategory 2220 which achieves the highest score $S_C$ on the Query $Q'_i$ is selected. The process then continues, and a banner advertisement associated with the supercategory chosen at the step 2360 is displayed to the user who has presented the Query $Q_i$. In addition, the user is presented with the set of categories $C_i$, of merchants or stores 2210 which have associated with them a term or terms describing the product(s) or service(s) which the merchants, stores or other sources associated with the category may provide, that matches any term or terms in the user query. The user then has the opportunity to select any of the categories presented, and to have displayed to him the list of merchants, stores or other sources associated with the category.

In this system, when a user, who has been presented with the list of categories $C_i$, selects a particular category $C_S$ for presentation of its list of merchants, stores or other sources, control returns to the step 2340, with the collection of categories $C_i$ replaced by the single category $C_S$.

At the step 2340, a new Query $Q'_i$ is prepared, now consisting of the terms which describe the product(s) or service (s) which the merchants; stores or other sources associated with the single category $C_S$ may provide, and with the further addition of the unique category identifier term $T_S$ which identifies the category $C_S$.

After the new Query $Q'_i$ is prepared at the step 2340, control passes to a step 2350, at which the new Query $Q'_i$ is run, on the collection $C'_o$ of supercategories 2220.

After the new Query $Q'_i$ is run on the collection $C'_o$ of supercategories 2220 at the step 2350, control passes to a step 2360, at which the supercategory 2220 which achieves the highest score on the Query $Q'_i$ is selected. The process then concludes, and a banner advertisement associated with the supercategory chosen at the step 2360 is displayed to the user. In addition, the list of merchants, stores or other sources of the product(s) or service(s) associated with the category $C_S$ is presented to the user While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method implemented by one or more computing devices, wherein the one or more computing devices are configured to perform the following:
   selecting a first document;
   generating a query containing at least one term from the selected first document;
   applying the generated query to a plurality of documents to define a subset of the plurality of documents, wherein the defined subset of the plurality of documents constitutes those documents of the plurality of documents that contain the at least one term and meet a predetermined threshold of query relevance;
   determining additional terms based on the defined subset of the plurality of documents, including:

determining a co-occurrence metric of the at least one term from the selected first document with each term of the defined subset of the plurality of documents;

determining a frequency score using the determined co-occurrence metric for each term of the defined subset of the plurality of documents; and selecting a subset of terms of the defined subset of the plurality of documents based on the determined frequency score for each term;

assigning the selected subset of terms to the selected first document; and storing the selected first document in a storage system that is remotely accessible via a network.

2. The method of claim 1, wherein the at least one term includes all terms in the selected first document.

3. The method of claim 1, wherein query relevance is determined using at least one of term frequency scoring and inverted document frequency scoring, and the predetermined threshold of query relevance is a maximum number of highest scoring documents.

4. The method of claim 3, wherein the query relevance is determined using Robertson's term frequency scoring.

5. The method of claim 1, wherein the plurality of documents are Web pages.

6. The method of claim 1, wherein the plurality of documents are Web sites.

7. The method of claim 1, wherein terms do not include stop words.

8. The method of claim 1, wherein selecting the subset of terms based on the determined frequency score for each term includes selecting terms having the determined frequency score above a predetermined term assignment threshold.

9. The method of claim 8, wherein the predetermined term assignment threshold is a single highest scoring term.

10. The method of claim 1, wherein assigning the selected subset of terms includes inserting the selected subset of terms into a portion of the selected first document.

11. The method of claim 10, wherein the portion of the selected first document is a segment of the selected first document for storing terms to improve document retrieval methods.

12. The method of claim 1, wherein the plurality of documents has previously had index terms assigned to the plurality of documents by another method.

13. The method of claim 12, wherein weighting is applied to the index terms assigned to the plurality of documents when applying the generated query to the plurality of documents.

14. The method of claim 1, wherein the network includes the Internet.

\* \* \* \* \*